US012659446B2

(12) United States Patent　　　(10) Patent No.:　US 12,659,446 B2
Ichihashi et al.　　　　　　　　　(45) Date of Patent:　Jun. 16, 2026

(54) INFORMATION PROCESSING APPARATUS AND INFORMATION PROCESSING METHOD

(71) Applicant: SONY GROUP CORPORATION, Tokyo (JP)

(72) Inventors: Hideyuki Ichihashi, Tokyo (JP); Noriaki Takahashi, Tokyo (JP); Takaaki Suzuki, Tokyo (JP); Haruka Mitsumori, Tokyo (JP); Yuto Kobayashi, Tokyo (JP); Takashi Nomoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/847,300

(22) PCT Filed: Jan. 27, 2023

(86) PCT No.: PCT/JP2023/002644
§ 371 (c)(1),
(2) Date: Sep. 16, 2024

(87) PCT Pub. No.: WO2023/181634
PCT Pub. Date: Sep. 28, 2023

(65) Prior Publication Data
US 2025/0211720 A1　　Jun. 26, 2025

(30) Foreign Application Priority Data
Mar. 24, 2022　(JP) ................................. 2022-048905

(51) Int. Cl.
H04N 13/156　　(2018.01)
H04N 13/302　　(2018.01)
*H04N 13/00*　　(2018.01)

(52) U.S. Cl.
CPC ......... *H04N 13/156* (2018.05); *H04N 13/302* (2018.05); *H04N 2013/0081* (2013.01)

(58) Field of Classification Search
CPC ............... H04N 13/156; H04N 13/302; H04N 2013/0081
(Continued)

(56) References Cited

U.S. PATENT DOCUMENTS 11,200,742 B1 * 12/2021 Post ..................... G06T 19/003
2014/0368602 A1 * 12/2014 Woodgate ................ G06T 7/73
348/47
(Continued)

FOREIGN PATENT DOCUMENTS

JP　　　2008-235989 A　　10/2008
JP　　　2011-242458 A　　12/2011
(Continued)

OTHER PUBLICATIONS

International Search Report and Written Opinion of PCT Application No. PCT/JP2023/002644, issued on Apr. 18, 2023, 09 pages of ISRWO.

*Primary Examiner* — Allen C Wong
(74) *Attorney, Agent, or Firm* — CHIP LAW GROUP

(57) ABSTRACT

An information processing apparatus according to an embodiment of the present technology includes an image acquisition section, a depth acquisition section, and a superimposition processor. The image acquisition section acquires a captured image of a first user who uses a stereoscopic display. The depth acquisition section acquires depth information regarding a second user who uses a non-stereoscopic display that communicates with the stereoscopic display. The superimposition processor superimposes a result of interaction of the second user on the captured image of the first user on the basis of the depth (Continued)

information, the captured image of the first user being displayed on the non-stereoscopic display.

11 Claims, 14 Drawing Sheets

(58) Field of Classification Search
USPC .......................................................... 348/43
See application file for complete search history.

(56) References Cited

U.S. PATENT DOCUMENTS

| | | | |
|---|---|---|---|
| 2019/0132584 A1* | 5/2019 | Yu ........................ | H04N 17/002 |
| 2021/0312715 A1* | 10/2021 | Ramani ..................... | G06F 8/34 |

FOREIGN PATENT DOCUMENTS

| | | |
|---|---|---|
| JP | 2012-222386 A | 11/2012 |
| JP | 2015-109111 A | 6/2015 |
| WO | 2018/230160 A1 | 12/2018 |
| WO | 2019/026598 A1 | 2/2019 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2023/002644 filed on Jan. 27, 2023, which claims priority benefit of Japanese Patent Application No. JP 2022-048905 filed in the Japan Patent Office on Mar. 24, 2022. Each of the above-referenced applications is hereby incorporated herein by reference in its entirety.

TECHNICAL FIELD

The present technology relates to an information processing apparatus, an information processing method, and a recording medium that can be applied to telepresence.

BACKGROUND ART

In recent years, a technology has been developed that connects multiple locations using communication to enable remote communication with a sense of realism by use of displays respectively used at the multiple locations. Such a technology may be referred to as a telepresence technology or tele-presentations. The telepresence technology may be considered an embodiment of a telecommunication technology.

In the telepresence technology, there is a need for a high-level sense of spatial co-presence and a high-level sense of reality of a person. Patent Literature 1 proposes an approach of causing persons to face each other, which is one of the purposes of the telepresence technology.

On the other hand, a stereoscopic display is known that is a display technology that makes a sense of reality of a display object greater. As such a stereoscopic display, a stereoscopic display that makes it possible to view display with naked eyes (Patent Literature 2), and a stereoscopic display that requires dedicated glasses (Patent Literature 3) are known. Note that embodiments of the stereoscopic display also include a head-mounted display (of which the disclosure is omitted) that makes an image in a real space invisible and replaces a field of view of a user with an image. (Note that Patent Literature 2 also proposes a system that enables a gesture to be input relative to a displayed stereoscopic object.)

When a stereoscopic display is applied to the telepresence technology in order to make a sense of reality of a person greater, stereoscopic displays are favorably used in all of the locations in order to share the same sense of reality. On the other hand, the diffusion rate of stereoscopic displays is not high even in recent years, compared with the diffusion rate of general non-stereoscopic displays. Thus, when a stereoscopic display is applied to the telepresence technology, communication may be expected to be performed between a stereoscopic display and a non-stereoscopic display. In this case, it may become difficult for a user of a stereoscopic display and a user of a non-stereoscopic display to interact with each other due to a difference between the users in perceived sense of co-presence or in perceived sense of reality.

CITATION LIST

Patent Literature

Patent Literature 1: WO 2019/026598
Patent Literature 2: Japanese Patent Application Laid-open No. 2012-222386

Patent Literature 3: Japanese Patent Application Laid-open No. 2015-109111

DISCLOSURE OF INVENTION

Technical Problem

The present disclosure proposes a technology that makes it possible to perform a proper interaction in terms of telepresence technology even when a stereoscopic display and a non-stereoscopic display communicate with each other, where there is asymmetry between respective display states of the stereoscopic display and the non-stereoscopic display.

Solution to Problem

In order to achieve the object described above, an information processing apparatus according to an embodiment of the present technology includes an image acquisition section, a depth acquisition section, and a superimposition processor. The image acquisition section acquires a captured image of a first user who uses a stereoscopic display. The depth acquisition section acquires depth information regarding a second user who uses a non-stereoscopic display that communicates with the stereoscopic display. The superimposition processor superimposes a result of interaction of the second user on the captured image of the first user on the basis of the depth information, the captured image of the first user being displayed on the non-stereoscopic display.

An information processing method according to an embodiment of the present technology is an information processing method that is performed by a computer system, the information processing method including acquiring a captured image of a first user who uses a stereoscopic display. Depth information regarding a second user who uses a non-stereoscopic display that communicates with the stereoscopic display is acquired. A result of interaction of the second user is superimposed on the captured image of the first user on the basis of the depth information, the captured image of the first user being displayed on the non-stereoscopic display.

A recording medium that records therein a program according to an embodiment of the present technology causes a computer system to execute a specified instruction. The specified instruction is used to perform a process including acquiring a captured image of a first user who uses a stereoscopic display; acquiring depth information regarding a second user who uses a non-stereoscopic display that communicates with the stereoscopic display; and superimposing a result of interaction of the second user on the captured image of the first user on the basis of the depth information, the captured image of the first user being displayed on the non-stereoscopic display.

MODE(S) FOR CARRYING OUT THE INVENTION

Embodiments according to the present technology will now be described below with reference to the drawings.
[Telepresence System]

Figure 1:
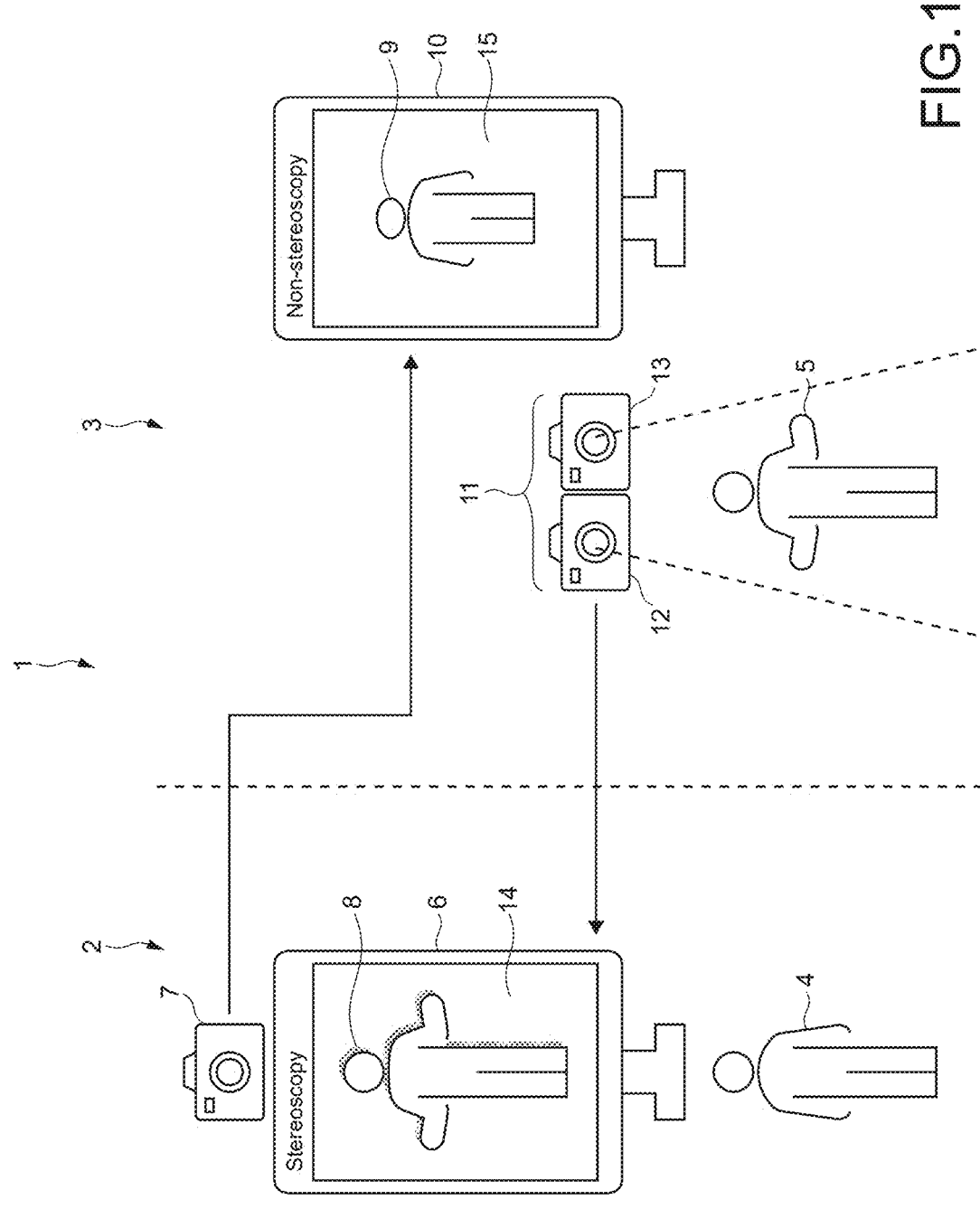
FIG. 1 schematically illustrates an example of a configuration of a telepresence system according to an embodiment of the present technology.

FIG. 1 schematically illustrates an example of a configuration of a telepresence system according to an embodiment of the present technology. Telepresence is a technology that connects multiple locations using communication to enable remote communication with a sense of realism by use of displays respectively used at the multiple locations. A telepresence system 1 according to the present technology enables users situated at places remote from each other to talk over the phone with a sense of realism while viewing their respective displays.

In the present embodiment, the telepresence system 1 is arranged for two spaces situated at places distant from each other. FIG. 1 illustrates two spaces obtained by division being performed by a middle dashed line. A user 4 who uses the telepresence system 1 in a space 2 is schematically illustrated on the left. Likewise, a user 5 who uses the telepresence system 1 in a space 3 is schematically illustrated on the right. In the present embodiment, the users 4 and 5 talk over the phone using the telepresence system 1.

FIG. 1 illustrates a user in each of the spaces 2 and 3. However, a plurality of users may be situated in each of the spaces 2 and 3. In other words, a plurality of persons may be capable of talking over the phone using the telepresence system 1. The user 4 corresponds to an embodiment of a first user according to the present technology. The user 5 corresponds to an embodiment of a second user according to the present technology.

The telepresence system 1 includes a stereoscopic display 6, a camera 7, a non-stereoscopic display 10, and a stereo camera 11. As illustrated in FIG. 1, the stereoscopic display 6 and the camera 7 are arranged in the space 2. The non-stereoscopic display 10 and the stereo camera 11 are arranged in the space 3.

The stereoscopic display 6 is a display with which a display object can be stereoscopically viewed by the user 4. Specifically, the stereoscopic display 6 displays thereon an image viewed by the user 4 with his/her right eye and an image viewed by the user 4 with his/her left eye. There is parallax between the respective images, and the user has a stereoscopic experience by viewing the different images with his/her right eye and with his/her left eye. In the present embodiment, an autostereoscopic display with which the user 4 can perform viewing with naked eyes (without wearing anything for his/her eyes) is used as the stereoscopic display 6. Of course, the stereoscopic display 6 is not limited thereto, and a stereoscopic display with which viewing is performed by, for example, dedicated glasses being worn, may be used as the stereoscopic display 6.

FIG. 1 schematically illustrates a captured image 14 displayed on the stereoscopic display 6. The captured image 14 includes a user image 8 that is an image of the user 5. The user 4 is stereoscopically viewing the user image 8. This enables the user 4 to feel as if the user 5 is with the user 4. The captured image 14 is acquired by the stereo camera 11 arranged in the space 3. The captured image 14 corresponds to an embodiment of a captured image of the second user according to the present technology.

The camera 7 is arranged above the stereoscopic display 6. In the present embodiment, image-capturing is performed by the camera 7 with respect to the space 2 in which the user 4 is situated. Accordingly, a captured image 15 is acquired. For example, a digital camera by which a moving image is captured, or an infrared camera is used as the camera 7. Moreover, any cameras may be used.

The non-stereoscopic display 10 arranged in the space 3 is a display with which a display object can be planarly viewed by the user 5. In other words, the non-stereoscopic display 10 can also be a commonly used display that is not used to view a display object stereoscopically. A display device using, for example, liquid crystal or electroluminescence (EL) is used as the non-stereoscopic display 10. Of course, the non-stereoscopic display 10 is not limited thereto, and any display devices may be used as the non-stereoscopic display 10.

FIG. 1 schematically illustrates the captured image 15 displayed on the non-stereoscopic display 10. The captured image 15 includes a user image 9 that is an image of the user 4. The user 5 is not stereoscopically viewing the user image 9. Thus, the user 5 is planarly viewing the user image 9. The captured image 15 is acquired by the camera 7 arranged in the space 2. The captured image 15 corresponds to an embodiment of a captured image of the first user according to the present technology.

The stereo camera 11 is arranged in front of the user 5. For example, when the user 5 looks at the non-stereoscopic display 10 from the front, the stereo camera 11 is arranged between the user 5 and the non-stereoscopic display 10. The stereo camera 11 includes a left camera 12 situated on the left as viewed from the user 5, and a right camera 13 situated on the right as viewed from the user 5. Image-capturing is performed by each of the left camera 12 and the right camera 13 with respect to the space 3 in which the user 5 is situated. Accordingly, two images between which there is parallax are acquired as the captured image 14.
[Superimposition of Avatar Image]

Figure 2:
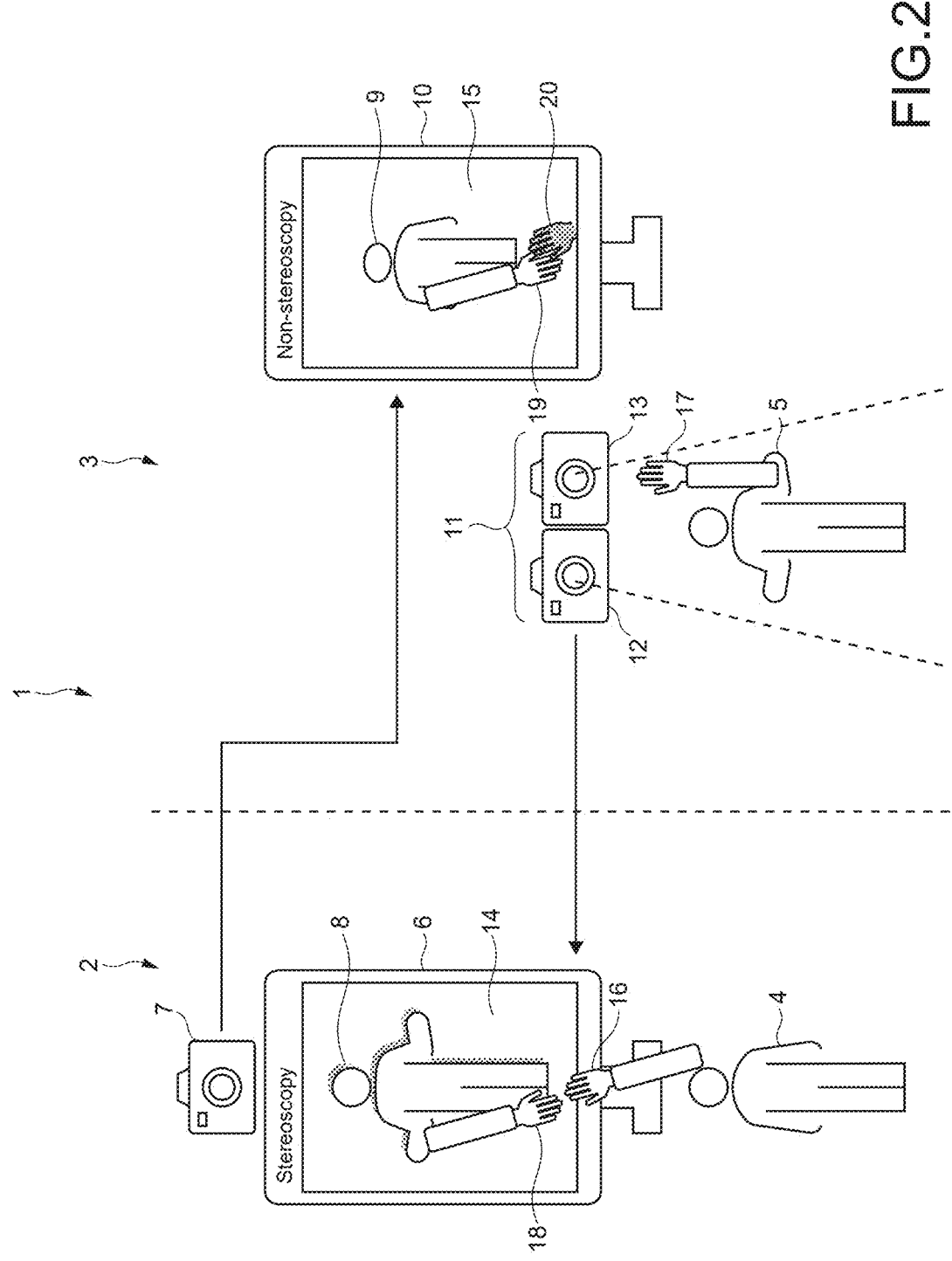
FIG. 2 schematically illustrates an example of superimposition of an avatar image.

In the present embodiment, an avatar image is superimposed on the captured image 15 displayed on the non-stereoscopic display 10. FIG. 2 schematically illustrates an example of superimposition of an avatar image.

FIG. 2 illustrates a state in which the users 4 and 5 are giving pseudo-handshakes to each other. In the space 3, the user 5 is extending his/her right hand 17. An image (a right-hand image 18) of the right hand 17 extended by the user 5 is displayed on the stereoscopic display 6. The user 4 is stereoscopically viewing the right-hand image 18. Thus, it looks like the right hand 17 of the user 5 is protruding toward the user 4, as viewed from the user 4. The user 4 causes a position of the right hand 16 to coincide with an apparent position of the right-hand image 18. This enables the user 4 to feel as if the user 4 is shaking hands with user 5.

In the space 2, the user 4 is extending his/her right hand 16. An image (a right-hand image 19) of the right hand 16 extended by the user 4 is displayed on the non-stereoscopic display 10. The user 5 is not stereoscopically viewing the right-hand image 19. Thus, the right-hand image 19 is planarly seen by the user 5.

Further, an avatar image 20 of a hand is displayed on the non-stereoscopic display 10. The avatar image 20 is an image that represents the right hand 17 of the user 5, and, for example, a drawing of the hand is used as the avatar image 20. The avatar image 20 is superimposed to be displayed on the captured image 15. The avatar image 20 is displayed to correspond to the apparent position of the right-hand image 18 stereoscopically viewed by the user 4 in the space 2. For example, it is assumed that the right hand 16 and the right-hand image 18 are situated at positions similar to each other and it looks like the user 4 is shaking hands with the user 5, as viewed from the user 4. In this case, the avatar image 20 is superimposed to be displayed at a position similar to a position of the right-hand image 19 on the non-stereoscopic display 10. It is assumed that the right hand 16 and the right-hand image 18 are distant from each other and it looks like the user 4 is not shaking hands with the user 5, as viewed from the user 4. In this case, the avatar image 20 is superimposed to be displayed at a position distant from the right-hand image 19 on the non-stereoscopic display 10. Further, the avatar image 20 is superimposed to be displayed such that a positional relationship between the right-hand image 18 and the right hand 16 of the user 4 as viewed from the user 4 corresponds to a positional relationship between the right-hand image 19 and the avatar image 20 on the non-stereoscopic display 10. For example, when it looks like the right-hand image 18 is situated on the left of the right hand 16, as viewed from the user 4, the avatar image 20 is superimposed to be displayed on the right of the right-hand image 19.

Further, a superimposition position for the avatar image 20 is changed according to a change in a position of the right hand 17. For example, when the user 5 moves the right hand 17 rightward, the superimposition position for the avatar image 20 is also changed rightward. Further, when the right hand 17 is extended forward in order to shake hands, the superimposition position for the avatar image 20 is slightly changed upward.

As described above, the avatar image 20 is superimposed to be displayed such that contents viewed by the user 4 are consistent with contents viewed by the user 5. For example, there is no possibility of the right-hand image 19 and the avatar image 20 being seen at similar positions, as viewed from the user 5, despite the fact that it looks like the right hand 16 and the right-hand image 18 are distant from each other, as viewed from the user 4. Alternatively, there is also no possibility of it looking like the right-hand image 18 is moving forward, as viewed from the user 4, despite the fact that the user 5 is extending his/her right hand 17 forward and the avatar image 20 is moving upward according to the extension of the right hand 17.

[Configuration of Telepresence System]

Figure 3:
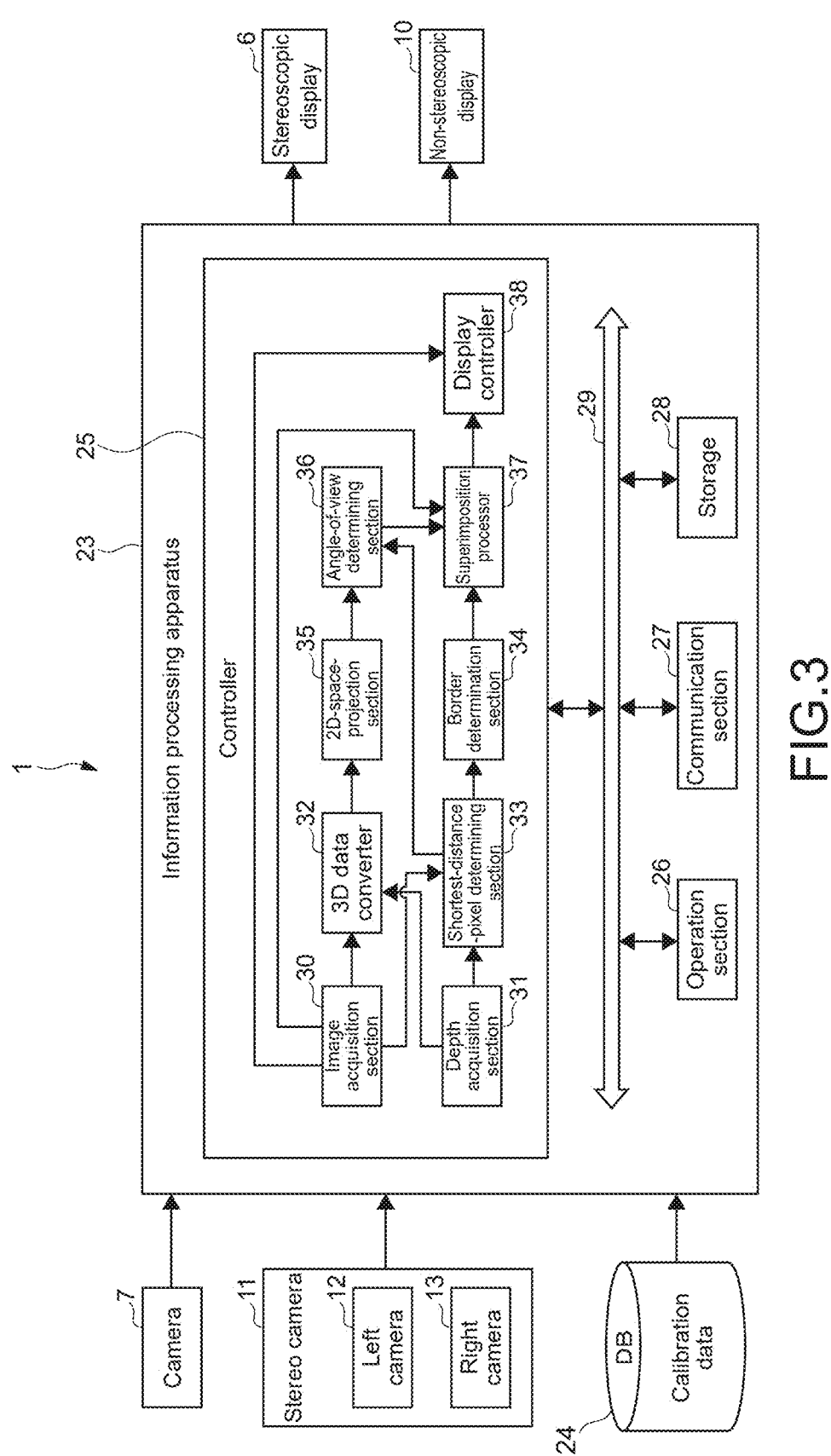
FIG. 3 is a block diagram illustrating an example of a configuration of the telepresence system.

FIG. 3 is a block diagram illustrating an example of a configuration of the telepresence system 1. The stereo camera 11 acquires depth information regarding the user 5. In other words, the stereo camera 11 acquires the captured image 14 and the depth information regarding the user 5 in the present embodiment. A method for acquiring the depth information regarding the user 5 is not limited. For example, a ranging sensor such as a time-of-flight (ToF) sensor or light detection and ranging or laser imaging detection and ranging (LiDAR) may be provided separately from the stereo camera 11.

The telepresence system 1 further includes an information processing apparatus 23 and a database (DB) 24. The information processing apparatus 23 is implemented by any computer such as a personal computer (PC). Alternatively, the information processing apparatus 23 and the stereoscopic display 6 or the non-stereoscopic display 10 may be integrated by the information processing apparatus 23 being built in the display. The information processing apparatus 23 includes a controller 25, an operation section 26, a communication section 27, and a storage 28. The controller 25, the operation section 26, the communication section 27, and the storage 28 are connected to each other through a bus 29. The respective blocks may be connected to each other using, for example, a communication network or an unstandardized unique communication approach instead of using the bus 25.

Examples of the operation section 26 include a keyboard, a pointing device, a touchscreen, and other operation apparatuses. For example, an operator who manages the telepresence system 1 can perform setting related to an operation of the information processing apparatus 23 using the operation section 22.

The communication section 27 is a module used to perform, for example, network communication or near field communication with another device. In the present embodiment, the communication section 27 causes the information processing apparatus 23 to communicate with the stereoscopic display 6. Further, the information processing apparatus 23 is also caused to communicate with the non-stereoscopic display 10. In other words, it can also be said that the stereoscopic display 6 and the non-stereoscopic display 10 communicate with each other through the information processing apparatus 23. Furthermore, the information processing apparatus 23 is also caused to communicate with each of the camera 7 and the stereo camera 11. Moreover, the information processing apparatus 23 may be capable of communicating with any apparatus.

The storage 28 is a storage device such as a nonvolatile memory, and, for example, an HDD or an SSD is used. Moreover, any non-transitory computer-readable storage medium may be used as the storage 28. The storage 28 stores therein a control program used to control an operation of the overall information processing apparatus 23. A method for installing the control program on the information processing apparatus 23 is not limited. For example, the installation may be performed through various recording media, or the installation of the program may be performed through, for example, the Internet.

The controller 25 includes hardware, such as a processor including a CPU, a GPU, and a DSP; a memory including a ROM and a RAM; and a storage device including an HDD, that is necessary for a configuration of a computer. For example, an information processing method according to the present technology is performed by the CPU loading, into the RAM, a program according to the present technology that is recorded in, for example, the ROM in advance and executing the program. For example, a programmable logic device (PLD) such as a field programmable gate array (FPGA), or another device such as an application specific integrated circuit (ASIC) may be used as the controller 25.

In the present embodiment, an image acquisition section 30, a depth acquisition section 31, a 3D data converter 32, a shortest-distance-pixel determining section 33, a border determination section 34, a 2D-space-projection section 35, an angle-of-view determining section 36, a superimposition processor 37, and a display controller 38 are implemented as functional blocks by the CPU of the controller 25 executing the program according to the present technology (such as an application program). Note that, in order to implement each functional block, dedicated hardware such as an integrated circuit (IC) may be used as appropriate.

The image acquisition section 30 acquires a captured image of the user 4 who uses the stereoscopic display 6. Specifically, the image acquisition section 30 acquires, from the camera 7, the captured image 15 corresponding to a captured image of the space 2 in which the user 4 is situated. Further, the image acquisition section 30 acquires the captured image 14 from the stereo camera 11.

The depth acquisition section 31 acquires depth information regarding the user 5 who uses the non-stereoscopic display 10. Specifically, the depth acquisition section 31 acquires the depth information regarding the user 5 from the stereo camera 11. Note that, for example, when a ranging sensor is provided separately from the stereo camera, the depth acquisition section 31 may acquire depth information from the ranging sensor.

The 3D data converter 32 calculates three-dimensional coordinates of the user 5 in the space 3 on the basis of the captured image 14 and the depth information regarding the user 5.

On the basis of the captured image 14 and the depth information regarding the user 5, the shortest-distance-pixel determining section 33 calculates three-dimensional coordinates of a portion of the user 5 in the space 3 that is situated closest to the stereo camera 11 (a shortest-distance portion). Further, the shortest-distance-pixel determining section 33 determines which pixels in the captured image 14 are pixels (shortest-distance pixels) used for image-capturing on the shortest-distance portion. For example, when the right hand 17 is situated closest to the stereo camera 11 in a body of the user 5, the right hand 17 corresponds to the shortest-distance portion, and pixels used for image-capturing on the right hand 17 are the shortest-distance pixels.

The border determination section 34 determines whether the shortest-distance pixel is situated at an image-outline border of the captured image 14. In the present embodiment, a rectangular image is captured as the captured image 14. Thus, the image-outline border is a border that forms a rectangle and corresponds to an edge portion of the captured image 14. The border determination section 34 determines whether the shortest-distance pixel is situated at the border. Of course, shapes of the captured image 14 and the image-outline border are not limited, and the captured image 14 and the image-outline border may be designed discretionarily.

The 2D-space-projection section 35 calculates imaginary coordinates (virtual coordinates) of the user 5 in the captured image 15 on the basis of the three-dimensional coordinates of the user 5 in the space 3. In the present embodiment, the camera 7 performs image-capturing on the space 2, and the captured image 15 is displayed on the non-stereoscopic display 10. Thus, when image-capturing is performed on a target object that is situated in the space 2, there is a correspondence relationship between coordinates of the target object in the space 2 and coordinates of the target object in the captured image 15. For example, when the target object is situated in an upper portion in a range of an angle of view of the camera 7, the target object appearing in the captured image 15 is also in an upper portion of the captured image 15. Thus, a Z coordinate of the target object in the space 2 exhibits a relatively large value, and a coordinate of the target object appearing in the captured image 15 also exhibits a relatively large value. On the other hand, when the target object is not situated in the range of the angle of view of the camera 7, the captured image 15 does not include an image of the target object. In this case, the coordinates of the target object in the captured image 15 are not defined.

Here, an apparent user 5 in the space 2 is considered a "target object" of which an image is captured by the camera 7. In other words, the following is considered: what values coordinates of the apparent user 5 in the captured image 15 will exhibit if the apparent user 5 really exists in the space 2 and the camera 7 captures an image of the user 5, although an image of the apparent user 5 is actually not captured. Accordingly, the imaginary coordinates of the user 5 in the captured image 15 can be considered. The 2D-space-projection section 35 calculates the "imaginary coordinates" as the virtual coordinates of the user 5 in the captured image 15. The virtual coordinates are calculated using calibration data stored in the DB 24.

The angle-of-view determining section 36 determines whether an apparent position of a shortest-distance portion in the space 2 is situated in the range of the angle of view of the camera 7. Specifically, first, the angle-of-view determining section 36 acquires virtual coordinates of the user 5 in the captured image 15 that are calculated by the 2D-space-projection section 35. Further, the angle-of-view determining section 36 acquires three-dimensional coordinates of the shortest-distance portion in the space 3 that are calculated by the shortest-distance-pixel determining section 33. Furthermore, it is determined whether there are virtual coordinates of the shortest-distance portion in the captured image 15, on the basis of the virtual coordinates of the user 5 in the captured image 15 and the three-dimensional coordinates of the shortest-distance portion in the space 3.

When there are the virtual coordinates of the shortest-distance portion in the captured image 15, this means that the apparent position of the shortest-distance portion in the space 2 is situated in the range of the angle of view of the camera 7. On the other hand, when there are not the virtual coordinates of the shortest-distance portion in the captured image 15, this means that the apparent position of the shortest-distance portion in the space 2 is not situated in the range of the angle of view of the camera 7. Thus, the determination of whether there are the virtual coordinates of the shortest-distance portion in the captured image 15 enables the angle-of-view determining section 36 to determine whether the apparent position of the shortest-distance portion in the space 2 is situated in the range of the angle of view of the camera 7.

The superimposition processor 37 superimposes the avatar image 20 on the captured image 14. In the present embodiment, the avatar image 20 is superimposed when the border determination section 34 determines that a shortest-distance pixel is not situated at the image-outline border of the captured image 14 and when the angle-of-view determining section 36 determines that the apparent position of the shortest-distance portion in the space 2 is situated in the range of the angle of view of the camera 7. Processing of superimposing the avatar image 20 and processing performed when the border determination section 34 and the angle-of-view determining section 36 perform other determinations will be described in detail later.

The 3D data converter 32, the shortest-distance-pixel determining section 33, the border determination section 34, the 2D-space-projection section 35, the angle-of-view determining section 36, and the superimposition processor 37 correspond to an embodiment of a superimposition processor according to the present technology.

The display controller 38 controls display of the captured image 14 on the stereoscopic display 6, display of the captured image 15 on the non-stereoscopic display 10, and display of the avatar image 20 on the non-stereoscopic display 10.

The DB 24 stores therein calibration data used by the 2D-space-projection section 35 to calculate virtual coordinates. Specifically, for example, a matrix is stored as the calibration data. Virtual coordinates of the user 5 in the captured image 15 are calculated by the 2D-space-projection section 35 performing matrix operation on three-dimensional coordinates of the user 5 in the space 3. Moreover, any information, such as a function and a table, that is used to calculate virtual coordinates may be stored. Further, information used to calculate not only virtual coordinates but also other parameters may be stored. Furthermore, these pieces of information may be stored in the storage 28.

[Superimposition of Interaction Result]

In the present embodiment, the image acquisition section 30 acquires the captured image 14 of the user 5 performing interaction. The interaction refers to various motions performed by the user 5. Examples of the interaction of the user 5 include a pseudo-handshake given to the user 4. In this case, the image acquisition section 30 acquires the captured image 14 of the user 5 giving a pseudo-handshake to the user 4 displayed on the non-stereoscopic display 10. The examples of the interaction also include a motion of the user 5 performing pseudo-pointing at a target object situated in the space 2. In this case, the image acquisition section 30 acquires the captured image 14 of the user 5 performing pseudo-pointing at a target object displayed on the non-stereoscopic display 10. Furthermore, the examples of the interaction according to the present technology also include a motion, such as the user 5 moving his/her hand in the air, that is not performed relative to a specific target. Moreover, the examples of the interaction may include any motions performed by the user 5.

Further, a result of interaction of the user 5 is superimposed by the superimposition processor 37 on the captured image 15 displayed on the non-stereoscopic display 10, on the basis of depth information regarding the user 5. The interaction result refers to an object used to perform interaction. For example, when the interaction is a pseudo-handshake, the interaction result is the right hand 17 of the user 5 giving a pseudo-handshake. Further, when the interaction is pseudo-pointing at a target object, the interaction result is the right hand 17 of the user 5 performing pseudo-pointing. Moreover, any object (such as a stick) other than a hand may be the interaction result according to the interaction.

The superimposition of an interaction result refers to superimposing an image corresponding to the interaction result on the captured image 15. In the present embodiment, the superimposition of an interaction result includes superimposing an avatar image of a body part of the user 5, the body part being used by the user 5 to perform interaction. For example, when the interaction result is the right hand 17 with which a pseudo-handshake is given, the superimposition of the interaction result is superimposing the avatar image 20 of the right hand 17. Furthermore, when the interaction result is a hand with which pseudo-pointing is performed, the superimposition of the interaction result is also superimposing the avatar image 20 of the right hand 17.

Moreover, any image (such as an image of a stick) corresponding to the interaction result may be superimposed according to the interaction result.

Figure 4:
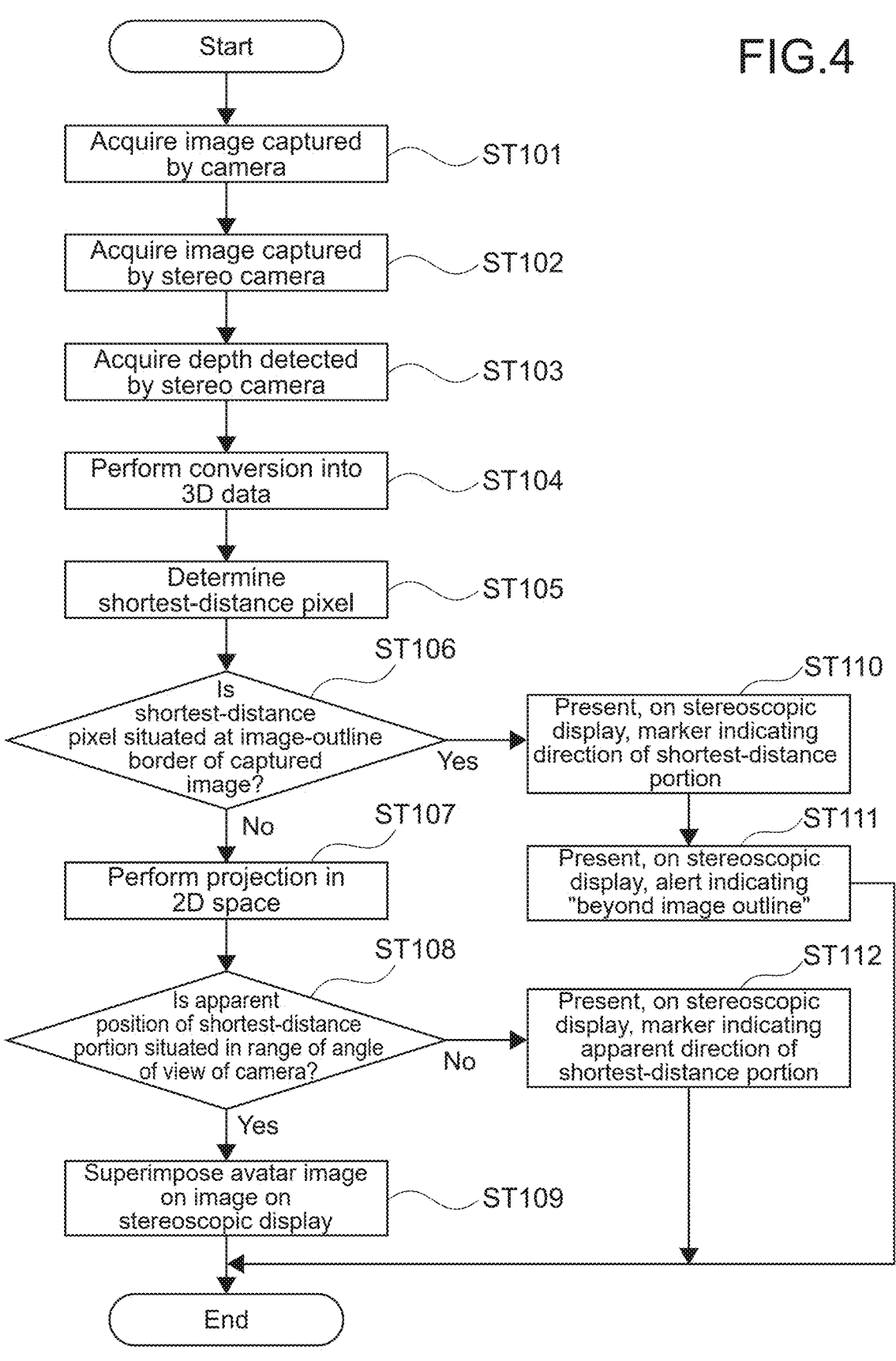
FIG. 4 is a flowchart illustrating an example of processing of controlling display on a non-stereoscopic display.

FIG. 4 is a flowchart illustrating an example of processing of controlling display on the non-stereoscopic display 10. FIGS. 5A, 5B, 6A, 6B, 7A, 7B, 8A, 8B, 9A, and 9B schematically illustrate the users 4 and 5 giving pseudo-handshakes to each other.

The image acquisition section 30 acquires the captured image 15 of the user 4 that is captured by the camera 7 (Step 101). The image acquisition section 30 acquires the captured image 14 of the user 5 that is captured by the stereo camera 11 (Step 102). The depth acquisition section 31 acquires depth information regarding the user 5 that is detected by the stereo camera 11 (Step 103). Specifically, a distance between the stereo camera 11 and each body part of the user 5 is acquired.

The 3D data converter 32 calculates three-dimensional coordinates of the user 5 in the space 3 (Step 104). First, the 3D data converter 32 acquires the captured image 14 from the image acquisition section 30. Further, the 3D data converter 32 acquires the depth information regarding the user 5 from the depth acquisition section 31. Then, three-dimensional coordinates of the user 5 in a range of an angle of view of the stereo camera 11 are calculated on the basis of the acquired captured image 14 and depth information regarding the user 5. Specifically, for example, "X=10 to 50, Y=20 to 60, Z=0 to 60", which is a coordinate range in which the user 5 is situated in the range of the angle of view of the stereo camera 11, is calculated. Further, only a coordinate range for a portion that appears in the captured image 14 (a front surface of the body of the user 5) may be calculated.

A method for calculating three-dimensional coordinates of the user 5 is not limited. For example, the three-dimensional coordinates of the user 5 can be calculated using a known approach on the basis of the captured image 14 and depth information regarding the user 5. Further, any reference position of a coordinate system and any type of coordinate system (such as a rectangular coordinate system or a polar coordinate system) may also be adopted.

The shortest-distance-pixel determining section 33 determines a shortest-distance pixel (Step 105). First, the shortest-distance-pixel determining section 33 acquires the captured image 14 from the image acquisition section 30. Further, the shortest-distance-pixel determining section 33 acquires the depth information regarding the user 5 from the depth acquisition section 31. Furthermore, the shortest-distance-pixel determining section 33 calculates three-dimensional coordinates of a shortest-distance portion in the range of the angle of view of the stereo camera 11 on the basis of the captured image 14 and the depth information regarding the user 5. Note that the shortest-distance portion of which three-dimensional coordinates are calculated is a shortest-distance portion "in the angle of view of the stereo camera 11". Thus, even if a portion of the user 5 that is situated outside of the range of the angle of view of the stereo camera 11 is situated closest to the stereo camera 11, three-dimensional coordinates of such a portion will not be calculated.

In the present embodiment, three-dimensional coordinates in a specified range centered at a portion of the user 5 that is situated closest to the stereo camera 11 are calculated as the three-dimensional coordinates of the shortest-distance portion. For example, when three-dimensional coordinates of the portion of the user 5 that is situated closest to the stereo camera 11 are represented by "X=30, Y=40, Z=30", three-dimensional coordinates in a range of "X=27 to 33, Y=37 to 43, Z=27 to 33" are calculated as the three-dimensional coordinates of the shortest-distance portion, the range being obtained by adding three to and subtracting three from each value of the original three-dimensional coordinates. For example, when the portion of the user 5 that is situated closest to the stereo camera 11 is a fingertip, a specified range centered at the fingertip corresponds to the shortest-distance portion.

Further, the shortest-distance-pixel determining section 33 determines which pixels are the shortest-distance pixels on the basis of the captured image 14 and the depth information regarding the user 5. In the present embodiment, a specified range (pixel group), in the captured image 14, that is centered at a pixel used for image-capturing on a portion of the user 5 that is closest to the stereo camera 11 corresponds to the shortest-distance pixels. In other words, two-dimensional coordinates such as "X=17 to 23, Y=27 to 33" are calculated as coordinate values of the shortest-distance pixels. The coordinate values of a shortest-distance pixel can be calculated on the basis of, for example, a histogram of depth information. Moreover, any approach may be used to calculate coordinate values of a shortest-distance pixel.

When coordinate values of a shortest-distance portion or coordinate values of shortest-distance pixels are calculated in the form of a specified range, this results in making the calculated coordinate values less likely to be affected by noise. In other words, coordinate values can be calculated with a high degree of accuracy. Of course, a size and the like of the specified range are not limited. Further, only coordinate values of a single point may be calculated precisely without a specified range being set.

Figure 5A:
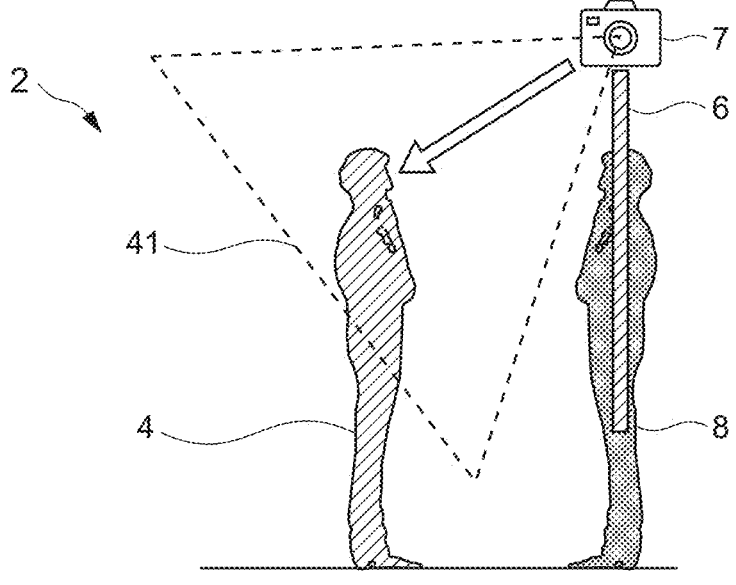
FIGS. 5A and 5B schematically illustrate users giving pseudo-handshakes to each other.

FIG. 5A schematically illustrates, by hatching, the user 4 standing straight in the space 2. Further, FIG. 5A schematically illustrates an apparent user image 8 by shading. Furthermore, FIG. 5A illustrates the stereoscopic display 6 and the camera 7. Moreover, FIG. 5A illustrates an angle of view 41 of the camera 7 by a dashed line. Note that FIG. 5A illustrates the apparent user image 8 in the form of an image of the entirety of the user 5, but this merely indicates a relative position of the entirety of the user 5 for description. Actually, the entirety of the user 5 is not displayed on the stereoscopic display 6. For example, legs of the user 5 are situated outside of a range of the angle of view 41. Thus, an image of the legs of the user 5 is not captured by the stereo camera 11 or the legs are not displayed on the stereoscopic display 6. The same applies to other figures including FIG. 6A.

Figure 5B:
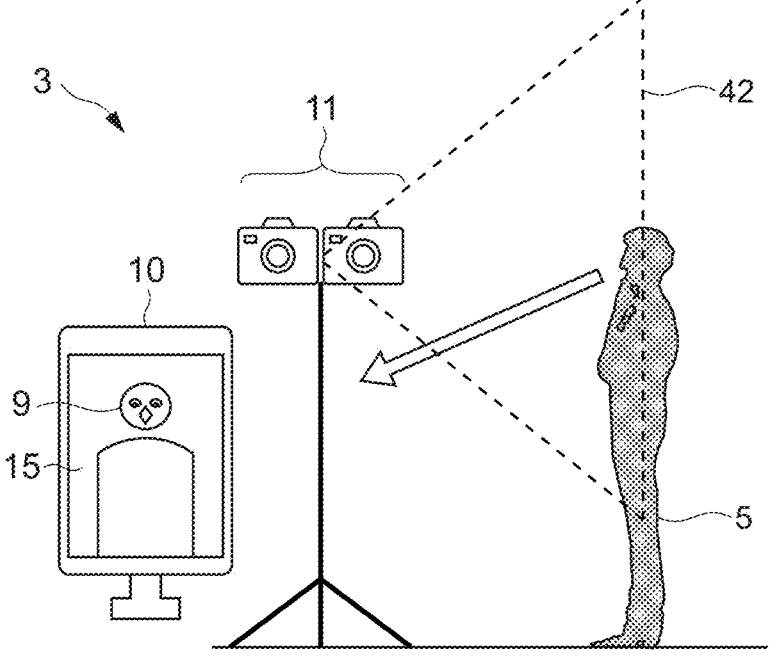

FIG. 5B schematically illustrates, by shading, the user 5 standing straight in the space 3. Further, FIG. 5B illustrates the non-stereoscopic display 10 and the stereo camera 11. The captured image 15 including the user image 9 is displayed on the non-stereoscopic display 10. Furthermore, FIG. 5B illustrates an angle of view 42 of the stereo camera 11 by a dashed line.

Figure 6A:
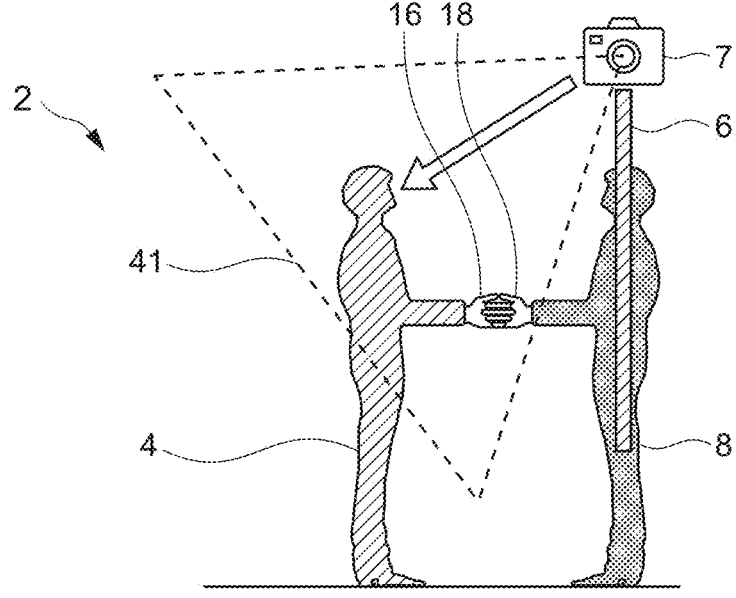
FIGS. 6A and 6B schematically illustrate the users giving pseudo-handshakes to each other.
Figure 6B:
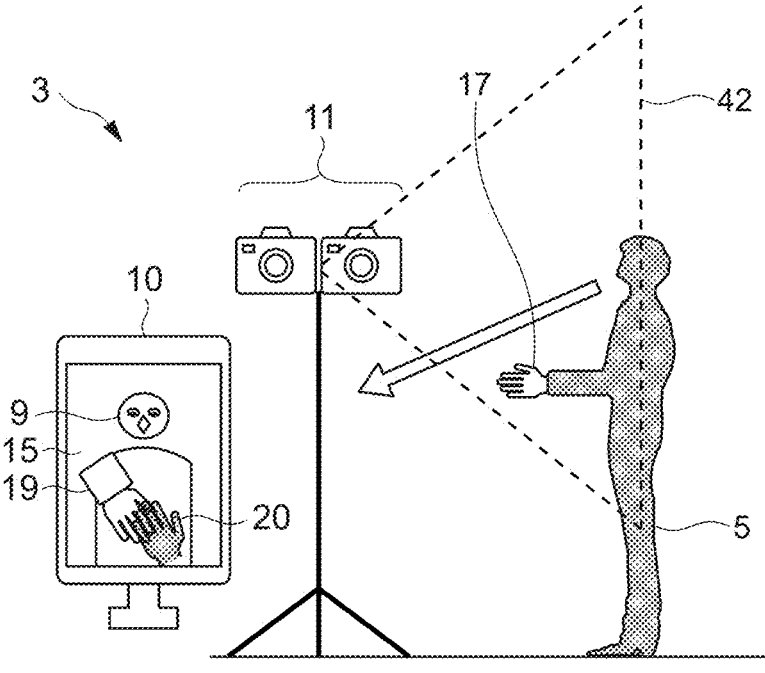

In FIGS. 6A and 6B, the user 4 is extending his/her right hand 16, the user 5 is extending his/her right hand 17, and the users 4 and 5 are giving pseudo-handshakes to each other.

Figure 7A:
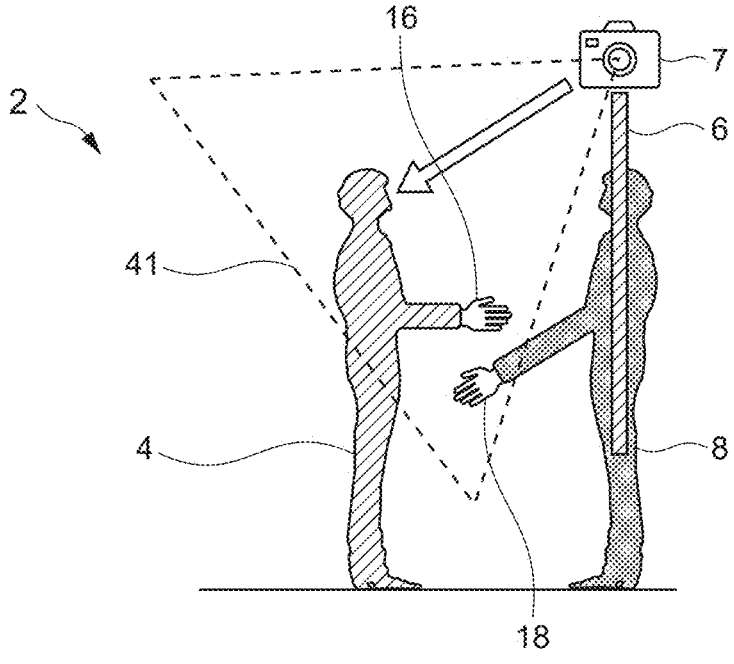
FIGS. 7A and 7B schematically illustrate the users giving pseudo-handshakes to each other.
Figure 7B:
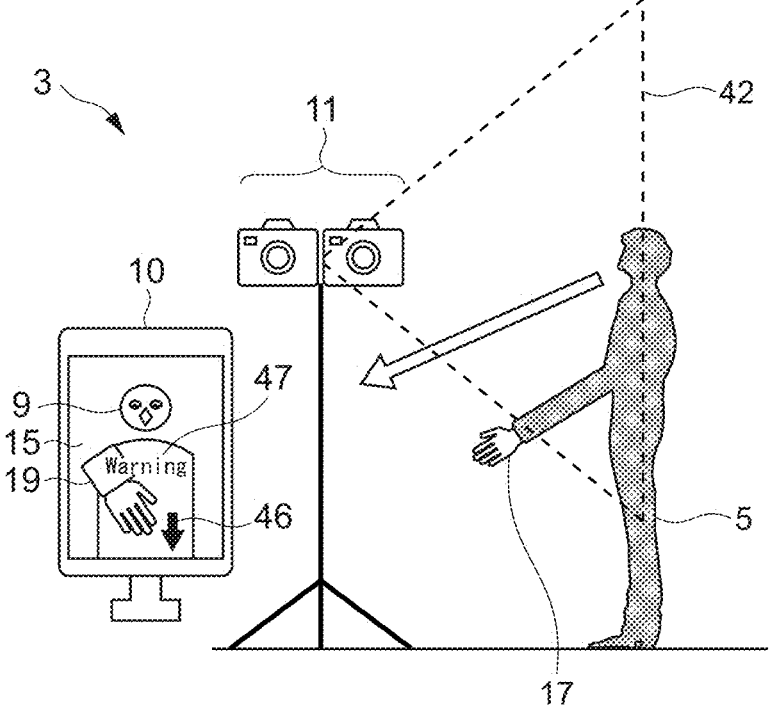
Figure 8A:
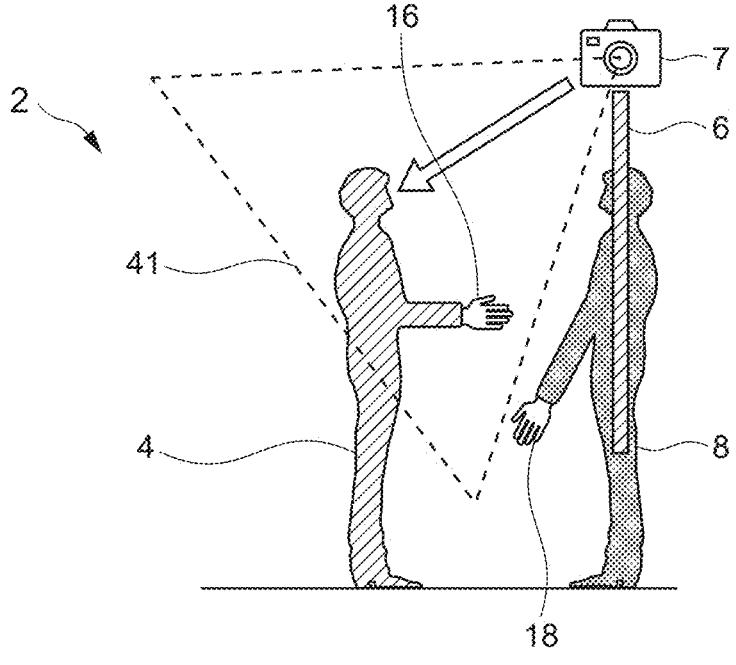
FIGS. 8A and 8B schematically illustrate the users giving pseudo-handshakes to each other.
Figure 8B:
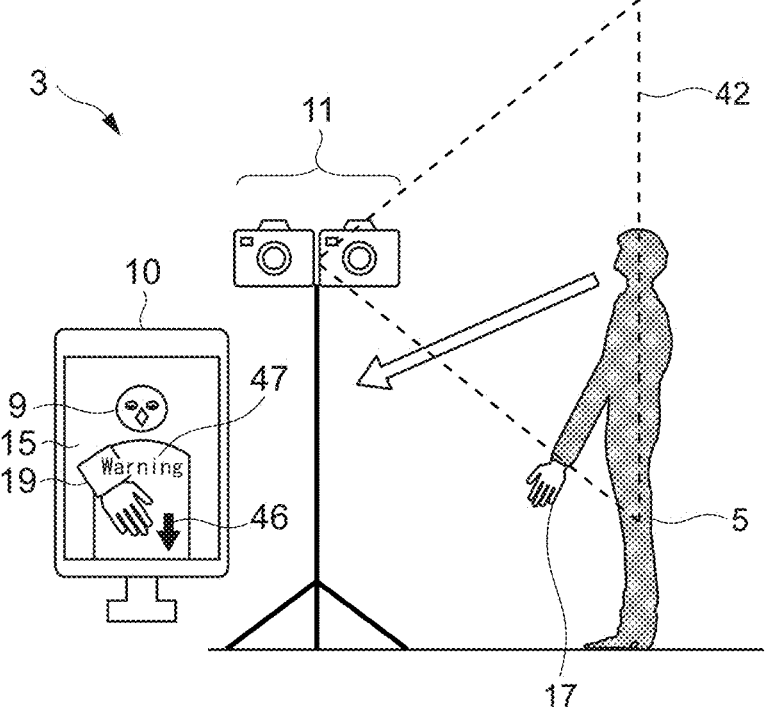

In FIGS. 7A and 7B and in FIGS. 8A and 8B, the user 4 is extending his/her right hand 16, and the user 5 is extending his/her right hand 17 further downward than the right hand 16 of the user 4.

The border determination section 34 determines whether a shortest-distance pixel is situated at the image-outline border of the captured image 14 (Step 106). The process of Step 106 is described below with reference to FIGS. 6A, 6B, 7A, 7B, 8A, and 8B. First, the border determination section 34 acquires coordinate values of a shortest-distance pixel from the shortest-distance-pixel determining section 33. Further, the border determination section 34 acquires coordinate values of the edge portion of the captured image 14 from the storage 28. In the present embodiment, a rectangular image is captured as the captured image 14. Thus, the edge portion is rectangular. In other words, coordinate values of the edge portion are in a range of, for example, "X=10, Y=30 to 50 (on the left)", "X=30, Y=30 to 50 (on the right)", "X=10 to 30, Y=30 (on the lower side)", and "X=10 to 30, Y=50 (on the upper side)". The coordinate values of the edge portion are determined in advance according to, for example, a position of or an image-capturing angle of the stereo camera 11, and stored in the storage 28.

Further, the border determination section 34 compares the coordinate values of a shortest-distance pixel with the coordinate values of the edge portion. When the coordinate values of the shortest-distance pixel are equal to the coordinate values of the edge portion, the shortest-distance pixel is determined to be situated at the image-outline border (the edge portion) of the captured image 14. On the other hand, when the coordinate values of the shortest-distance pixel are not equal to the coordinate values of the edge portion, the shortest-distance pixel is determined to not be situated at the image-outline border of the captured image 14. As described above, the process of Step 106 is performed.

For example, the right hand 17 is extended toward the stereo camera 11 in the example illustrated in FIG. 6B. Thus, the shortest-distance pixel is a pixel used for image-capturing on the right hand 17. The right hand 17 is situated in a range of the angle of view 42. Thus, the shortest-distance pixel is a pixel situated in the captured image 14 (in a portion other than the edge portion). Thus, in this case, the coordinate values of the shortest-distance pixel are not equal to the coordinate values of the edge portion. The coordinate values of the shortest-distance pixel are represented by, for example, "X=20, Y=40", and are not in the range of the coordinate values of the edge portion. In other words, when the right hand 17 is in the range of the angle of view 42, as illustrated in FIG. 6B, the shortest-distance pixel is determined to not be at the image-outline border of the captured image 14.

In the examples illustrated in FIGS. 7B and 8B, the right hand 17 is extended toward the stereo camera 11, and the right hand 17 is situated outside of the range of the angle of view 42 (on the lower side). The shortest-distance portion is a portion of the user 5 that is situated closest to the stereo camera 11 in the range of the angle of view 42. Thus, in this case, the shortest-distance portion corresponds to a right wrist of the user 5 that is situated at a lower border in the range of the angle of view 42. The right wrist of the user 5 appears in a lower edge portion of the captured image 14. Thus, coordinate values of the shortest-distance pixel (a pixel used for image-capturing on the right wrist) are equal to coordinate values of the edge portion. Specifically, the coordinate values of the shortest-distance pixel are values of, for example, "X=20, Y=30", and are in a range of the coordinate values of the lower edge portion, that is, "X=10 to 30, Y=30". In other words, when the right hand 17 is situated outside of the range of the angle of view 42, as in FIGS. 7B and 8B, the shortest-distance pixel is determined to be at the image-outline border of the captured image 14.

Here, the user 5 is trying to give a pseudo-handshake in FIGS. 6A, 6B, 7A, 7B, 8A, and 8B. Thus, the right hand 17 is a result of interaction of the user 5. In other words, the interaction result (the right hand 17) is displayed on the stereoscopic display 6 in FIG. 6A. On the other hand, the interaction result is not displayed on the stereoscopic display 6 in FIG. 7A or 8A. Thus, it can also be said that the border determination section 34 determines whether a result of interaction of the user 5 is displayed on the stereoscopic display 6, on the basis of information regarding the edge portion of the captured image 14 of the user 5 performing interaction.

Note that the information regarding the edge portion that is used for determination is not limited to coordinate values, and any information may be used. Further, coordinate values of a single point are set to be coordinate values of a shortest-distance pixel when the process of Step 106 is described, in order to simplify the description. However, of course, the coordinate values of a shortest-distance pixel may correspond to a specified range. In this case, for example, the coordinate values of the shortest-distance pixels are determined to be equal to the coordinate values of the edge portion when coordinate values in a portion of the specified range are equal to the coordinate values of the edge portion. Alternatively, the coordinate values of the shortest-distance pixels may be determined to be equal to the coordinate values of the edge portion when coordinate values in a certain range included in the specified range are equal to the coordinate values of the edge portion.

When the shortest-distance pixel is determined to not be situated at the image-outline border of the captured image 14 (No in Step 106), the 2D-space-projection section 35 calculates virtual coordinates of the user 5 in the captured image 15 (Step 107). In other words, the process of Step 107 is performed in a state illustrated in, for example, FIGS. 6A and 6B.

First, the 2D-space-projection section 35 acquires three-dimensional coordinates of the user 5 in the space 3 from the 3D data converter 32. Further, the 2D-space-projection section 35 acquires calibration data from the DB 24. Furthermore, computing processing using calibration data is performed on the three-dimensional coordinates of the user 5. Accordingly, the virtual coordinates of the user 5 in the captured image 15 is calculated. The following is an example of the calculation of virtual coordinates corresponding to coordinates of each point on the user 5 in the space 3: virtual coordinates that correspond to values of "X=30, Y=40, Z=30" that represent coordinates of a single point on the user 5 in the space 3 are represented by "X=20, Y=40". Note that, when an apparent position of the user image 8 in the space 2 is not situated in the range of the angle of view of the camera 7, the virtual coordinates of the user 5 in the captured image 15 are not defined. Thus, a point of which corresponding virtual coordinates are not calculated (do not exist) also exists on the user 5.

The angle-of-view determining section 36 determines whether an apparent position of the shortest-distance portion in the space 2 is situated in the range of the angle of view of the camera 7 (Step 108). First, the angle-of-view determining section 36 acquires the virtual coordinates of the user 5 from the 2D-space-projection section 35. Further, the angle-of-view determining section 36 acquires the three-dimensional coordinates of the shortest-distance portion in the space 3 from the shortest-distance-pixel determining section 33. Furthermore, it is determined whether there exist virtual coordinates of the shortest-distance portion in the captured image 15 on the basis of the virtual coordinates of the user 5 and the three-dimensional coordinates of the shortest-distance portion.

For example, when values of "X=30, Y=40, Z=30" are acquired as the coordinates of the shortest-distance portion, it is determined whether virtual coordinates corresponding to "X=30, Y=40, Z=30" exist in the acquired virtual coordinates.

In the example illustrated in FIG. 6A, an apparent position of the shortest-distance portion (the right hand 17), that is, the apparent position of the right-hand image 18 is situated in the range of the angle of view 41. In such a case, there exist virtual coordinates corresponding to the shortest-distance portion. In other words, if the apparent shortest-distance portion really exists, an image of the apparent shortest-distance portion will be captured by the camera 7, and the image of the apparent shortest-distance portion will be included in the captured image 15. In other words, if there exist virtual coordinates corresponding to the shortest-distance portion, the apparent position of the shortest-distance portion will be situated in the range of the angle of view 41.

Figure 9A:
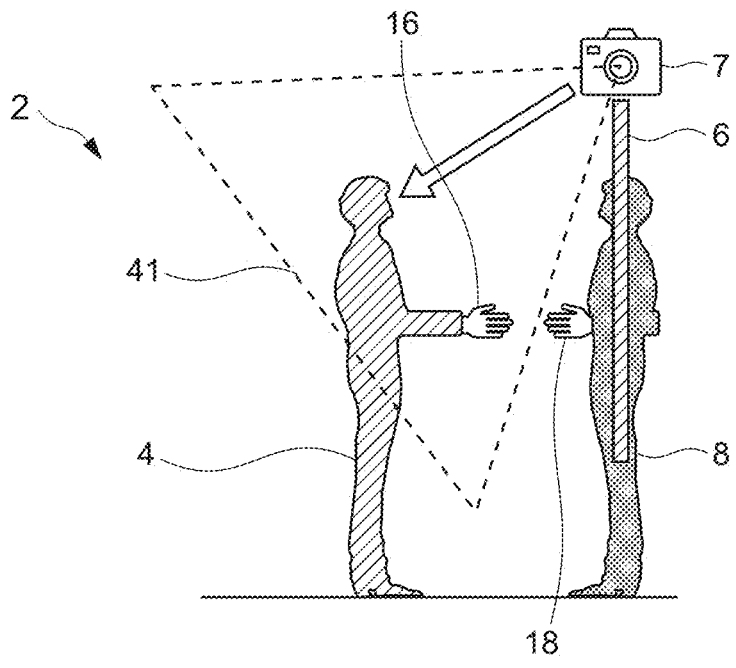
FIGS. 9A and 9B schematically illustrate the users giving pseudo-handshakes to each other.

On the other hand, the apparent position of the shortest-distance portion is situated outside of the range of the angle of view 41 in the example illustrated in FIG. 9A. In such a case, there exist no virtual coordinates corresponding to the shortest-distance portion. In other words, if there exist no virtual coordinates corresponding to the shortest-distance portion, the apparent position of the shortest-distance portion will be situated outside of the range of the angle of view 41.

As described above, the angle-of-view determining section 36 determines whether there exist virtual coordinates corresponding to a shortest-distance portion, and determines, according to a result of the determination, whether an apparent position of the shortest-distance portion is situated in the range of the angle of view 41.

When it has been determined that the apparent position of the shortest-distance portion is in the range of the angle of view 41 (Yes in Step 108), the avatar image 20 is superimposed on an image on the stereoscopic display 6 (Step 109). In other words, the process of Step 109 is performed in a state illustrated in, for example, FIGS. 6A and 6B.

The superimposition processor 37 superimposes the avatar image 20 of a result of interaction of the user 5 such that the avatar image 20 corresponds to an apparent position of the interaction result displayed on the stereoscopic display 6, the apparent position being an apparent position as viewed from the user 4. In the present embodiment, the users 4 and 5 are giving pseudo-handshakes to each other. Thus, the interaction result is the right hand 17 with which a pseudo-handshake is given. Further, the superimposition of the avatar image of the interaction result is superimposing the avatar image 20 of the right hand 17 of the user 5. Thus, the superimposition processor 37 superimposes the avatar image 20 of the right hand 17 of the user 5 such that the avatar image 20 corresponds to an apparent position of the right hand 17 with which a pseudo-handshake is given by the user 5, the apparent position being an apparent position as viewed from the user 4.

Specifically, first, the superimposition processor 37 calculates a position of superimposition performed with respect to the captured image 15, the superimposition position corresponding to the apparent position of the result of interaction of the user 5, the apparent position being an apparent position as viewed from the user 4, the interaction result being displayed on the stereoscopic display 6. In other words, a superimposition position for the avatar image 20 on the captured image 15 is calculated such that the avatar image 20 corresponds to the apparent position of the right hand 17 of the user 5 (the apparent position of the right-hand image 18) displayed on the stereoscopic display 6.

First, the superimposition processor 37 acquires the captured image 15 from the image acquisition section 30. Further, the superimposition processor 37 acquires the avatar image 20 to be superimposed on the captured image 15. For example, the avatar image 20 is stored in the storage 28 in advance, and the superimposition processor 37 acquires the avatar image 20 from the storage 28. Further, the superimposition processor 37 acquires the virtual coordinates of the shortest-distance portion from the angle-of-view determining section 36. Then, the superimposition processor 37 superimposes the avatar image 20 on the captured image 15 using the acquired virtual coordinates of the shortest-distance portion as a superimposition position.

For example, in the example illustrated in FIG. 6B, the shortest-distance portion is the right hand 17 in the space 3, and coordinates of a lower portion of the captured image 15 are acquired as virtual coordinates of the shortest-distance portion. Thus, the avatar image 20 is superimposed on the lower portion of the captured image 15. The superimposition processing is performed such that the avatar image 20 corresponds to the apparent position of the right-hand image 18 in the space 2. For example, when the right hand 16 of the user 4 overlaps an apparent right-hand image 18 of the user 5 and it looks like the users 4 and 5 are giving pseudo-handshakes to each other, as viewed from the user 4, the right-hand image 19 of the user 4 overlaps the avatar image 20 of the hand of the user 5 in the captured image 15 and it also looks like the users 4 and 5 are giving pseudo-handshakes to each other, as viewed from the user 5. In other words, contents viewed by the user 4 are consistent with contents viewed by the user 5.

The display controller 38 controls display of the captured image 15 on the non-stereoscopic display 10, where the avatar image 20 is superimposed on the captured image 15. Specifically, the display controller 38 acquires, from the superimposition processor 37, the captured image 15 on which the avatar image 20 is superimposed. Then, display of the captured image 15 on the non-stereoscopic display 10 is controlled, where the avatar image 20 is superimposed on the captured image 15. This results in the captured image 15 on which the avatar image 20 is superimposed being displayed on the non-stereoscopic display 10, as illustrated in FIG. 6B.

Further, the display controller 38 controls display of the captured image 14 on the stereoscopic display 6.

Specifically, the display controller 38 acquires the captured image 14 from the image acquisition section 30. Then, display of the captured image 14 on the stereoscopic display 6 is controlled. This results in the captured image 14 being displayed on the stereoscopic display 6.

When it has been determined that the shortest-distance pixel is situated at the image-outline border of the captured image 14 (Yes in Step 106), a marker indicating a direction of the shortest-distance portion is presented on the stereoscopic display 6 (Step 110). In other words, the process of Step 110 is performed in a state illustrated in, for example, FIGS. 7A and 7B or 8A and 8B.

In the present embodiment, an arrow 46 is superimposed to be displayed by the superimposition display section 37 as the marker indicating the direction of the shortest-distance portion. For example, in the examples illustrated in FIGS. 7B and 8B, the right hand 17 is situated outside of the range of the angle of view 42 (on the lower side), and the shortest-distance portion (a wrist) is situated in a lower edge portion in the range of the angle of view 42. In this case, the shortest-distance portion is situated in a lower direction. In other words, the arrow 46 oriented downward is superimposed to be displayed.

An alert indicating "beyond the image outline" is presented on the stereoscopic display 6 (Step 111). In the present embodiment, the superimposition processor 37 superimposes an alert image on the captured image 15 when a result of interaction of the user 5 is not displayed on the stereoscopic display 6. In the examples illustrated in FIGS. 7B and 8B, the right hand 17 is situated outside of the range of the angle of view 42. Thus, the right-hand image 18 is not displayed on the stereoscopic display 6. In other words, the interaction result is not displayed. In such a case, the alert image is superimposed on the captured image 15. In the present embodiment, a word 47 indicating "Warning" is superimposed on the captured image 15 as the alert image. Of course, another word or drawing may be superimposed as the alert image.

When it has been determined that the apparent position of the shortest-distance portion is not situated in the range of the angle of view 41 (No in Step 108), a marker indicating an apparent direction of the shortest-distance portion is presented on the stereoscopic display 6 (Step 112). In other words, the process of Step 112 is performed in a state illustrated in, for example, FIGS. 9A and 9B.

In the present embodiment, when the calculated superimposition position is not in a displayed-image range for the captured image 15, the superimposition processor 37 superimposes the marker on the captured image 15. In the example illustrated in FIGS. 9A and 9B, the apparent position of the right-hand image 18 is situated outside of the range of the angle of view 41. Thus, there exist no virtual coordinates of the right hand 17 in the captured image 15. However, the virtual coordinates of the right hand 17 can also be defined in such a case. In other words, the virtual coordinates are not in a coordinate range for the captured image 15, but can be defined as coordinates situated outside of the coordinate range for the captured image 15. Specifically, the apparent position of the right-hand image 18 is situated in a forward direction (on the side of the stereoscopic display 6) in the range of the angle of view 41, as viewed from the user 4. Thus, the virtual coordinates of the right hand 17 are situated outside on the lower side of the coordinate range for the captured image 15.

If the superimposition processor 37 calculates a superimposition position on the basis of the virtual coordinates defined as described above, the superimposition position not being situated in the captured image 15 will be calculated. Thus, the superimposition does not exist in the displayed-image range for the captured image 15 on the non-stereoscopic display 10. In other words, the avatar image 20 is not displayed on the non-stereoscopic display 10.

A marker is superimposed on the captured image 15 in such a case. In the present embodiment, an arrow 45 is superimposed on the captured image 15 as the marker. The arrow 45 is oriented toward a direction of the virtual coordinates of the right hand 17 with respect to the coordinate range for the captured image 15. In the example illustrated in, for example, FIG. 9B, the virtual coordinates of the right hand 17 are situated outside on the lower side of the coordinate range for the captured image 15. Thus, the arrow 45 is also oriented downward. Likewise, when, for example, the apparent position of the right-hand image 18 is situated on the right of the range of the angle of view 41, as viewed from the user 4 (on a front side in FIG. 6A), the virtual coordinates of the right hand 17 are situated outside on the left of the coordinate range for the captured image 15.

Thus, the arrow 45 oriented leftward is superimposed to be displayed on the left in the captured image 15. Note that, in order to distinguish the arrow 45 displayed when the avatar image 20 is not superimposed to be displayed (the example illustrated in FIG. 6B) from the arrow 46 displayed when the right hand 17 is situated outside of the range of the angle of view 42 (the examples illustrated in FIGS. 7B and 8B), the arrows 45 and 46 may be displayed in different colors or shapes. Further, the marker superimposed on the captured image 15 is not limited to an arrow, and any marker may be superimposed.

In the telepresence system 1 according to the present embodiment, a result of interaction of the user 5 who uses the non-stereoscopic display 10 is superimposed on an image of the user 4 who uses the stereoscopic display 6, as described above. This makes it possible to perform a proper interaction in terms of telepresence technology even when the stereoscopic display 6 and the non-stereoscopic display 10 communicate with each other, where there is asymmetry between respective display states of the stereoscopic display 6 and the non-stereoscopic display 10.

A sense of spatial co-presence and a sense of reality of a person are important factors for telepresence. Eye contact made with a communication partner is one of factors for attaining a sense of spatial co-presence. A sense of co-presence is attained by talking to a communication partner in a state in which eye contact has been made with the communication partner. Various approaches have been proposed in order to make eye contact with a communication partner in telepresence.

Further, stereoscopic viewing of a video is one of factors for attaining a sense of reality of a person. When a user views a video of a communication partner stereoscopically, this makes it possible to attain a sense of reality of a person, the sense of reality causing the user to feel as if the person is with the user. Various approaches have been proposed in order to provide stereoscopic viewing of a video in telepresence. On the other hand, if both users use their stereoscopic displays, there will be a need for a special system. This results in more strict constraints on what can be done. Thus, any telepresence system including stereoscopic displays used by respective users is not yet available as a realistic solution.

Thus, a telepresence system including a non-stereoscopic display as a display used by one of users has been proposed. In other words, a telepresence system having an asymmetric configuration in which one of users uses a stereoscopic display to stereoscopically views another of the users, and the other of the users uses a non-stereoscopic display to planarly views the one of the users, has been proposed. The telepresence system having such a configuration imposes less strict constraints on technologies and costs, and is actually used in various scenes. The telepresence system 1 according to the present technology is also an example of such a telepresence system including a stereoscopic display and a non-stereoscopic display.

In a telepresence system having such a configuration, a higher quality of communication is ensured for a user who views a stereoscopic display than for a user who views a non-stereoscopic display. Thus, such a telepresence system is expected to be used when there is a superior-and-inferior relationship between users.

For example, the telepresence system is expected to be used in a scene in which an insurance product or a financial product is explained. In this case, a customer who receives an explanation views a stereoscopic display, and an explainer views a non-stereoscopic display. When the customer stereoscopically views an image of the explainer, this enables the customer to receive an explanation about a product while feeling as if the explainer is with the customer. Further, the telepresence system is expected to be used in a scene of a handshake session of, for example, an idol. When a fan stereoscopically views an image of an idol, this enables the fan to have experience in feeling as if the fan is actually shaking hands with the idol.

However, in such a telepresence system, a user who views a non-stereoscopic display is not allowed to check a relative position of his/her hand. FIGS. 10A, 10B, 11A, and 11B schematically illustrate a telepresence system according to a comparative example. FIGS. 10A, 10B, 11A, and 11B illustrate, as a comparative example, a telepresence system in which the avatar image 20 or a marker is not superimposed to be displayed on the captured image 15.

Figure 10A:
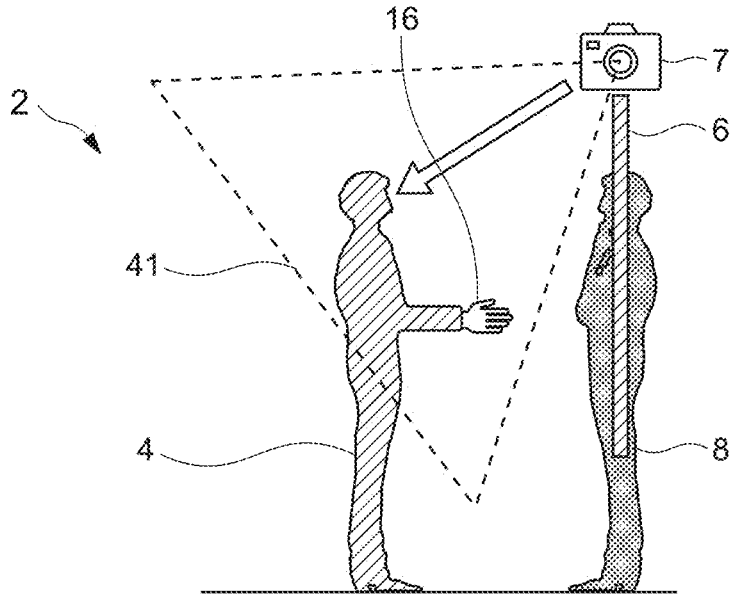
FIGS. 10A and 10B schematically illustrate a telepresence system according to a comparative example.
Figure 10B:
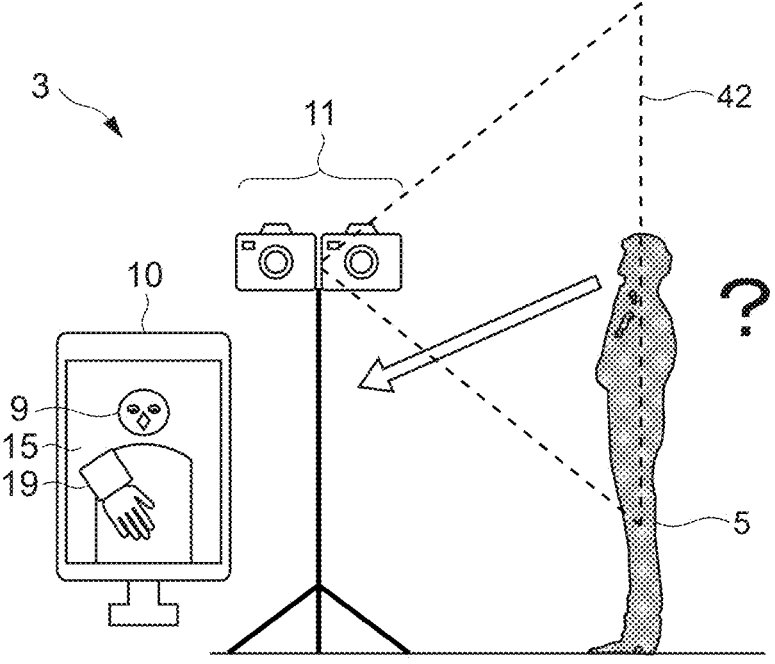
Figure 11A:
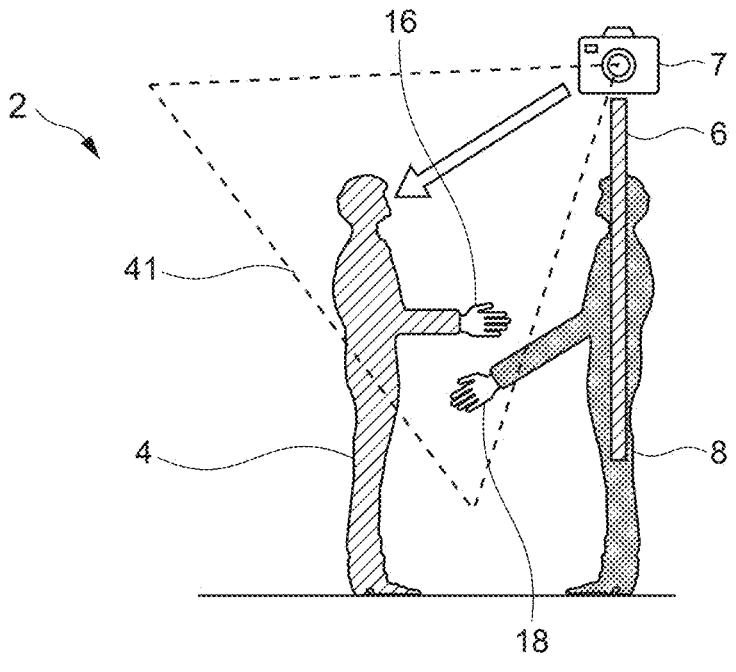
FIGS. 11A and 11B schematically illustrate the telepresence system according to the comparative example.
Figure 11B:
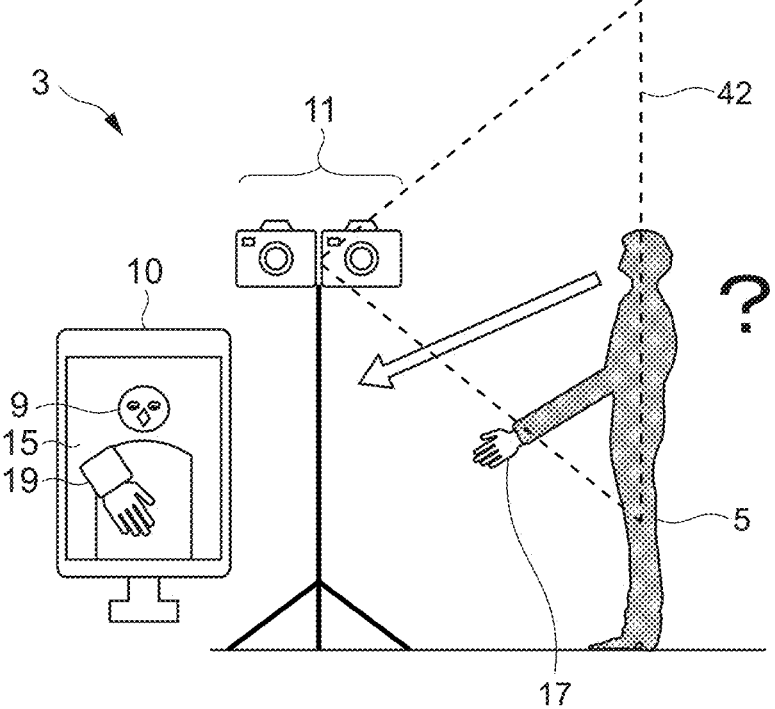

In the telepresence system according to the comparative example, the user 4 can also cause a position of his/her hand to coincide with an apparent position of a hand of the user 5 when, for example, the user 5 extends his/her hand to give a pseudo-handshake to the user 4, since the user 4 stereoscopically views a video of the user 5. Thus, the users 4 and 5 can give pseudo-handshakes to each other. On the other hand, the user 5 does not know where to extend his/her hand to give a pseudo-handshake to the user 4 when the user 4 extends his/her hand, as illustrated in FIGS. 10A and 10B, since the user 5 planarly views a video of the user 4. In other words, the user 5 does not know where to extend his/her hand so that it looks like the hand of the user 5 overlaps the hand of the user 4, as viewed from the user 4.

It is also necessary that the user 5 respond to a handshake suggestion given by the user 4 in such a case. Thus, the user 5 extends, from necessity, his/her hand toward a position estimated by the user 5 himself/herself while estimating that the user 5 could shake hands with the user 4 by extending his/her hand around a certain region. Consequently, an apparent position of the hand of the user 5 is shifted from a position of the hand of the user 4 in most cases. This results in being unable to shake hands.

In the telepresence system 1 according to the present technology, the avatar image 20 is superimposed to be displayed on the captured image 15 such that the avatar image 20 corresponds to an apparent position of a hand of the user 5, the apparent position being an apparent position as viewed from the user 4. Consequently, the user 5 understands a relative position of his/her hand. For example, when the apparent position of the hand of the user 5 is situated lower than the position of the hand of the user 4, the avatar image 20 is accordingly superimposed to be displayed on a lower portion of the right-hand image 19 of the user 4. The user 5 checks a position of the avatar image 20 to understand that the apparent position of his/her hand is situated lower than the position of the hand of the user 4. Then, the user 5 moves his/her hand upward to correct the apparent position of his/her hand. This enables the user 5 to cause the apparent position of his/her hand to coincide with the position of the hand of the user 4 (to give a pseudo-handshake with the user 4).

Further, the avatar image 20 of a body part used to perform interaction is superimposed as an interaction result. When, for example, a pseudo-handshake is given as interaction, the avatar image 20 of a hand is superimposed to be displayed. This enables the user 5 to intuitively understand that the superimposed and displayed avatar image 20 represents the hand of the user 5 and that the avatar image 20 moves according to movement of his/her hand.

Furthermore, a marker is superimposed on the captured image 15 when a superimposition position for the avatar image 20 that is calculated by the superimposition processor 37 is not in the displayed-image range for the captured image 15.

Consequently, the user 5 understands that a virtual position of his/her hand is situated outside of a displayed-image range for the non-stereoscopic display 10. Further, this enables the user 5 to correct the virtual position of his/her hand by moving his/her hand, such that the virtual position of his/her hand is in the displayed-image range. In other words, this enables the user 5 to cause the apparent position of his/her hand to get close to the position of the hand of the user 4.

In the present embodiment, the arrow 45 is superimposed to be displayed as a marker, and the arrow 45 notifies, using its direction, a direction in which the virtual position of the hand of the user 5 is situated outside of a screen. Consequently, the user 5 understands in which direction his/her hand is to be moved, and can cause the apparent position of his/her hand to get close to the position of the hand of the user 4 more smoothly.

Further, an alert image is superimposed to be displayed on the captured image 15 by the superimposition processor 37 when the hand of the user 5 is not displayed on the stereoscopic display 6. Consequently, the user 5 understands that an image of his/her hand is not displayed on the stereoscopic display 6 viewed by the user 4. In other words, the user 5 no longer believes that the user 4 is seeing the hand of the user 5 despite the fact that the hand of the user 5 is not seen by the user 4. This makes it possible to perform communication more smoothly.

Furthermore, the superimposition processor 37 determines whether the hand of the user 5 is displayed on the stereoscopic display 6, on the basis of information regarding the edge portion of the captured image 14. This enables the user 5 to accurately determine whether the hand of the user 5 is displayed on the stereoscopic display 6.

Moreover, the image acquisition section 30 acquires the captured image 14 captured by the stereo camera 11, and the depth acquisition section 31 acquires depth information regarding the user 5 that is detected by the stereo camera 11. In other words, the stereo camera 11 acquires both the captured image 14 and depth information. This makes it possible to obtain the telepresence system 1 having a simpler configuration, compared to, for example, when a ranging sensor used to acquire depth information is separately provided.

Further, an autostereoscopic display is used as the stereoscopic display 6 in the present embodiment. This enables the user 4 to use the telepresence system 1 with less effort without wearing, for example, dedicated glasses.

Furthermore, the display controller 38 controls each of display of the captured image 15 on the non-stereoscopic display 10 and display of the captured image 14 on the stereoscopic display 6, where the avatar image 20 is superimposed on the captured image 15. This enables the user 4 to check an image of the user 5. Further, this enables the user 5 to check an image of the user 4 and the avatar image 20.

Other Embodiments

The present technology is not limited to the embodiments described above, and can achieve various other embodiments.

Figure 12A:
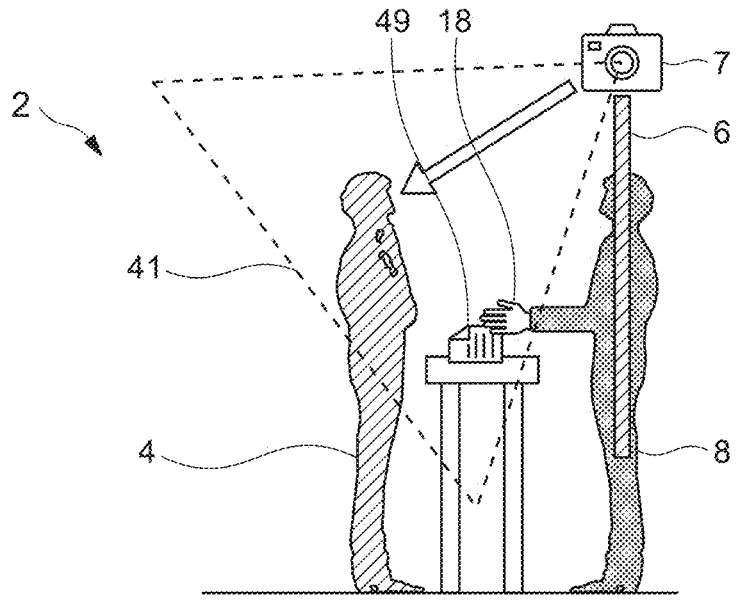
FIGS. 12A and 12B schematically illustrate the user performing another interaction.
Figure 12B:
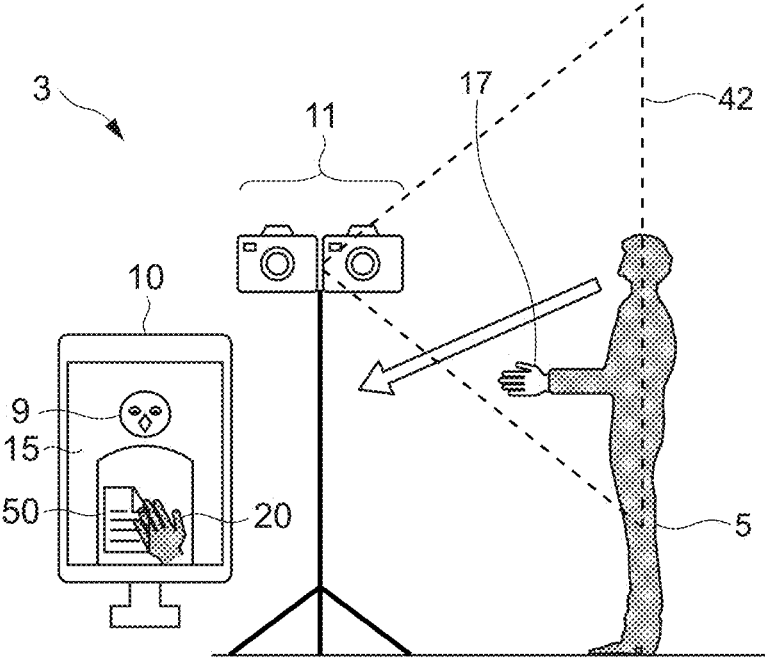

FIGS. 12A and 12B schematically illustrates the user 5 performing another interaction. The avatar image 20 may be superimposed to be displayed not only when the user 5 extends his/her hand to give a pseudo-handshake but also in response to any other interaction. In the example illustrated in FIGS. 12A and 12B, the superimposition processor 37 superimposes the avatar image 20 of the right hand 17 of the user 5 such that the avatar image 20 corresponds to an apparent position of the right hand 17 with which the user 5 performs pseudo-pointing at a target object, the apparent position being an apparent position as viewed from the user 4. In the example illustrated in FIGS. 12A and 12B, a document 49 is situated in the space 2 as a target object, and a document image 50 that is an image of the document 49 is displayed on the non-stereoscopic display 10. The user 5 performs pseudo-pointing at the document 49 by pointing at the document image 50.

Further, the avatar image 20 of the right hand 17 of the user 5 is superimposed to be displayed on the captured image 15. The superimposition processor 37 calculates virtual coordinates of the right hand 17, and the avatar image 20 is superimposed on the calculated virtual coordinates to perform the superimposition and displaying as illustrated in FIG. 12B, as in the case of the example illustrated in, for example, FIGS. 6A and 6B. For example, this makes it possible to smoothly explain about an insurance product or a financial product using a document when the telepresence system 1 is used for the explanation of the insurance product or the financial product. Specifically, for example, this results in the users 4 and 5 properly understanding which line in the document the user 5 is pointing at, and thus in the users 4 and 5 communicating with each other with consistency.

Figure 13:
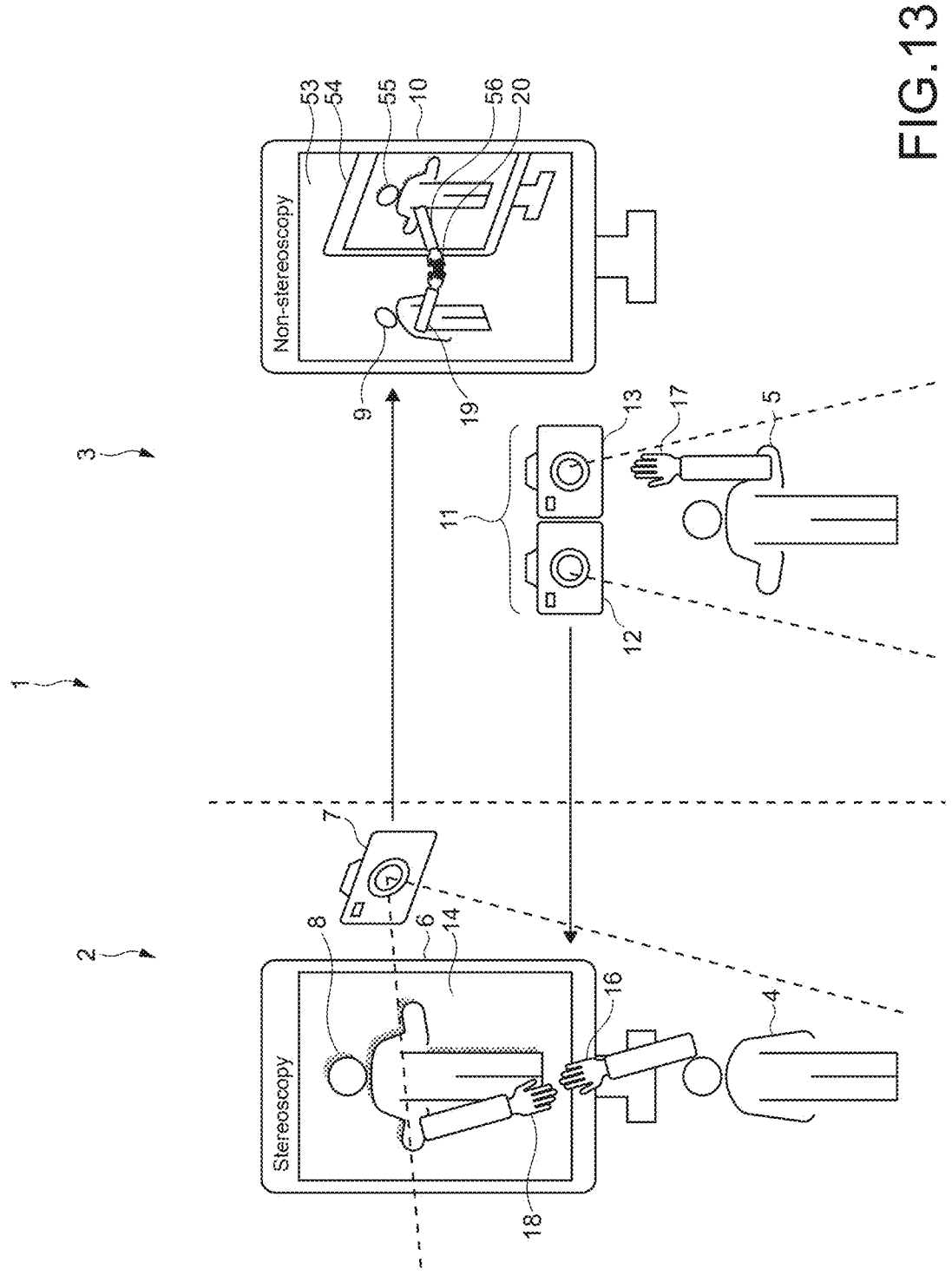
FIG. 13 schematically illustrates a third-person-viewpoint image being displayed on the non-stereoscopic display.

FIG. 13 schematically illustrates a third-person-viewpoint image being displayed on the non-stereoscopic display 10. Images of the user 4 and the stereoscopic display 6 that are captured at a viewpoint of a third person may be displayed on the non-stereoscopic display 10. In the example illustrated in FIG. 13, the image acquisition section 30 acquires a third-person-viewpoint image 53 that corresponds to the captured image 15 in which the user 4 and the stereoscopic display 6 appear, the stereoscopic display 6 displaying thereon the captured image 14 of the user 5. Further, with respect to the user 5 appearing in the third-person-viewpoint image 53, the superimposition processor 37 superimposes the avatar image 20 on the third-person-viewpoint image 53 displayed on the non-stereoscopic display 10.

The camera 7 is arranged on the right of the stereoscopic display 6, as viewed from the user 4, such that the user 4 and the stereoscopic display 6 are in a range of an angle of view of the camera 7. This results in the camera 7 capturing the third-person-viewpoint image 53 in which both the user 4 and the stereoscopic display 6 appear. Of course, the camera 7 may be arranged at any position or in any orientation that makes it possible to perform image-capturing on both the user 4 and the stereoscopic display 6.

The third-person-viewpoint image 53 includes a stereoscopic-display image 54 that is an image of the stereoscopic display 6. Further, the third-person-viewpoint image 53 includes a user image 55 that is an image of the user image 9 displayed on the stereoscopic display 6.

Further, the superimposition processor 37 superimposes the avatar image 20 on the third-person-viewpoint image 53. The avatar image 20 is superimposed with respect to the user image 55 included in the third-person-viewpoint image 53. Specifically, virtual coordinates of the right hand 17 in the third-person-viewpoint image 53 are calculated, and the avatar image 20 is superimposed to be displayed on the calculated virtual coordinates, as in the case of the example illustrated in, for example, FIGS. 6A and 6B. Further, an avatar image 56 of an arm is superimposed to be displayed such that the avatar image 20 is connected to the user image 55. For example, a drawing of the arm is displayed as the avatar image 56 of the arm. In other words, with respect to a position of the user image 55, the avatar image 56 of the arm is superimposed to be displayed such that the arm is extended from the user image 55, and the avatar image 20 of the hand is superimposed to be displayed on a tip of the avatar image 56 of the arm.

This enables the user 5 to check how the user 5 looks to the user 4. Further, this makes it easy to grasp a height of the avatar image 20, compared to when the avatar image 20 is displayed at a normal viewpoint, as in the case of, for example, FIGS. 6A and 6B.

The present technology can be applied to not only stationary displays such as the stereoscopic display 6 and the non-stereoscopic display 10, but also head-mounted displays (HMDs). For example, an HMD that enables stereoscopic viewing is provided instead of the stereoscopic display 6, and the user 4 wears the HMD enabling stereoscopic viewing. Further, a commonly used HMD (an HMD that makes it possible to view an image planarly) is provided instead of the non-stereoscopic display 10, and the user 5 wears the commonly used HMD. The telepresence system 1 having such a configuration can also be provided. This makes it possible to provide the user 4 with, for example, a greater sense of realism or a greater sense of reality of the user 5.

A real image of the right hand 17 of the user 5 may be displayed as the avatar image 20. Further, point cloud or the like of the right hand 17 of the user 5 may be displayed as the avatar image 20. In this case, for example, the 3D data converter 32 calculates three-dimensional coordinates of the right hand 17, and the point cloud is generated on the basis of the calculated three-dimensional coordinates. Consequently, the user 5 understands more intuitively that the avatar image 20 corresponds to his/her right hand 17.

A dedicated recognition engine may determine whether a shortest-distance portion is the right hand 17 of the user 5. For example, the telepresence system 1 includes a recognition engine used to recognize a hand, and whether a shortest-distance portion is a hand is determined. This makes it possible to calculate virtual coordinates of the right hand 17 more accurately, and to superimpose the avatar image 20 more accurately.

Figure 9B:
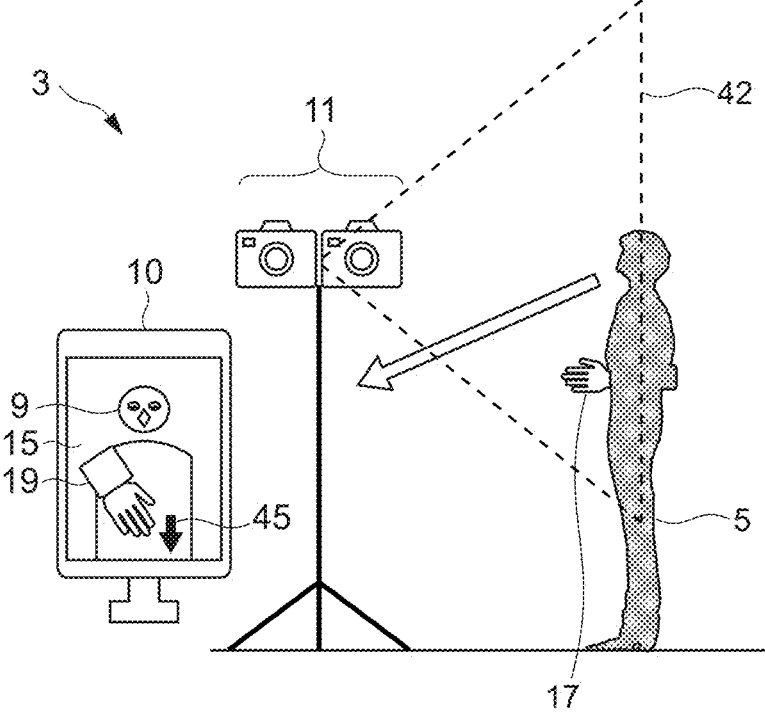

In the example illustrated in FIG. 9B, a superimposition position for the arrow 45 may be calculated according to the apparent position of the right-hand image 18. For example, when the apparent position of the right-hand image 18 is situated outside on the lower side of the range of the angle of view 41, as in the case of FIG. 9A, the arrow 45 is superimposed to be displayed near a lower border of the captured image 15. In this case, for example, when the apparent position of the right-hand image 18 is situated outside in a rightward region on the lower side of the range of the angle of view 41, the arrow 45 may be displayed near a rightward region at the lower border of the captured image 15. Likewise, when the apparent position of the right-hand image 18 is situated outside in a leftward region on the lower side of the range of the angle of view 41, the arrow 45 may be displayed near a leftward region at the lower border of the captured image 15. In this case, the superimposition position for the arrow 45 is calculated on the basis of, for example, virtual coordinates of the right hand 17. Consequently, the user 5 understands a virtual position of his/her right hand 17 more precisely.

A portion of or all of the functions of the stereoscopic display 6, non-stereoscopic display 10, camera 7, and stereo camera 11 illustrated in FIG. 1 may be included in the information processing apparatus 23. Further, the telepresence system 1 may be implemented by a plurality of computers or a single computer.

Figure 14:
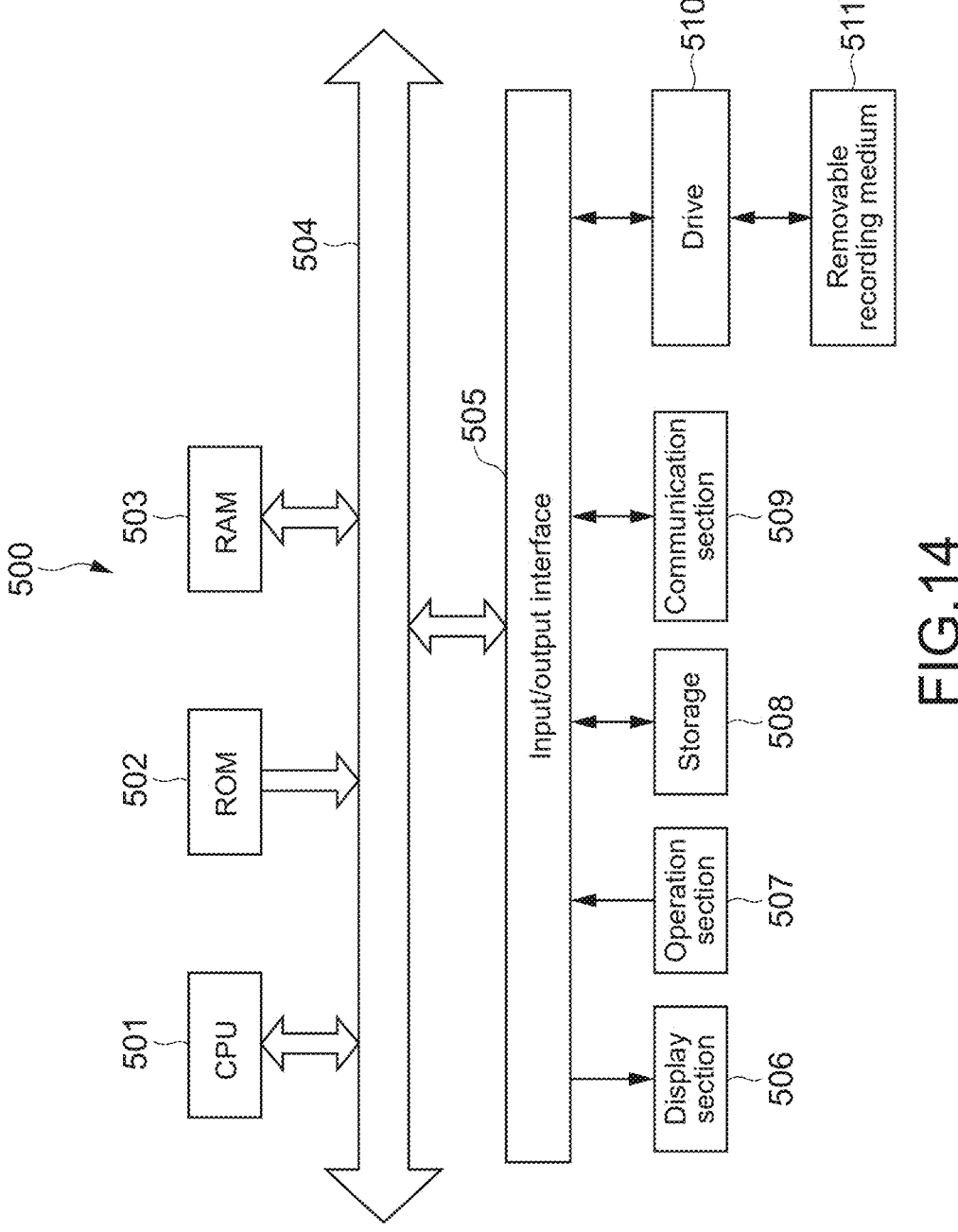
FIG. 14 is a block diagram illustrating an example of a hardware configuration of a computer by which an information processing apparatus can be implemented.

FIG. 14 is a block diagram illustrating an example of a hardware configuration of a computer 500 by which the information processing apparatus 23 can be implemented. The computer 500 includes a CPU 501, a ROM 502, a RAM 503, an input/output interface 505, and a bus 504 through which these components are connected to each other. A display section 506, an input section 507, a storage 508, a communication section 509, a drive 510, and the like are connected to the input/output interface 505.

The display section 506 is a display device using, for example, liquid crystal or EL. Examples of the input section 507 include a keyboard, a pointing device, a touchscreen, and other operation apparatuses. When the input section 507 includes a touchscreen, the touchscreen may be integrated with the display section 506. The storage 508 is a nonvolatile storage device, and examples of the storage 508 include an HDD, a flash memory, and other solid-state memories. The drive 510 is a device that can drive a removable recording medium 511 such as an optical recording medium or a magnetic recording tape. The communication section 509 is a modem, a router, or another communication apparatus that can be connected to, for example, a LAN or a WAN and is used to communicate with another device. The communication section 509 may perform communication wirelessly or by wire. The communication section 509 is often used in a state of being separate from the computer 500.

Information processing performed by the computer 500 having the hardware configuration described above is performed by software stored in, for example, the storage 508 or the ROM 502, and hardware resources of the computer 500 working cooperatively. Specifically, the information processing method according to the present technology is performed by loading, into the RAM 503, a program included in the software and stored in the ROM 502 or the like and executing the program.

For example, the program is installed on the computer 500 through the removable recording medium 511. Alternatively, the program may be installed on the computer 500 through, for example, a global network. Moreover, any non-transitory storage medium that is readable by the computer 500 may be used.

The information processing method according to the present technology may be executed and the information processing system and the information processing apparatus according to the present technology may be implemented by a plurality of computers working cooperatively, the plurality of computers being a plurality of computers connected through, for example, a network to be capable of communicating with each other. In other words, the information processing method according to the present technology can be executed not only in a computer system that includes a single computer, but also in a computer system in which a plurality of computers operates cooperatively.

Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

The execution of the information processing method according to the present technology by the computer system includes, for example, both the case in which the acquisition of a captured image, the acquisition of depth information, the superimposition of an interaction result, the superimposition of a marker, the superimposition of an alert image, the calculation of superimposition position, the display control, and the like are executed by a single computer; and the case in which the respective processes are executed by different computers. Further, the execution of the respective processes by a specified computer includes causing another computer to execute a portion of or all of the processes and acquiring a result of it. In other words, the information processing method according to the present technology is also applicable to a configuration of cloud computing in which a single function is shared and cooperatively processed by a plurality of apparatuses through a network.

The telepresence system, contents displayed on the stereoscopic display and the non-stereoscopic display 10, the information processing apparatus, the respective processing flows, and the like described with reference to the respective figures are merely embodiments, and any modifications may be made thereto without departing from the spirit of the present technology. In other words, for example, any other configurations or algorithms for purpose of practicing the present technology may be adopted.

At least two of the features of the present technology described above can also be combined. In other words, the various features described in the respective embodiments may be combined discretionarily regardless of the embodiments. Further, the various effects described above are not limitative but are merely illustrative, and other effects may be provided.

Note that the present technology may also take the following configurations.

(1) An information processing apparatus, including:
an image acquisition section that acquires a captured image of a first user who uses a stereoscopic display;
a depth acquisition section that acquires depth information regarding a second user who uses a non-stereoscopic display that communicates with the stereoscopic display; and
a superimposition processor that superimposes a result of interaction of the second user on the captured image of the first user on the basis of the depth information, the captured image of the first user being displayed on the non-stereoscopic display.

(2) The information processing apparatus according to (1), in which
the image acquisition section acquires a captured image of the second user performing the interaction, and
on the basis of the depth information, the superimposition processor superimposes an avatar image of the result of the interaction of the second user on the captured image of the first user such that the avatar image corresponds to an apparent position of the interaction result displayed on the stereoscopic display, the apparent position being an apparent position as viewed from the first user.

(3) The information processing apparatus according to (2), in which
the superimposition of the interaction result includes superimposing an avatar image of a body part of the second user on the captured image of the first user, the body part being used by the second user to perform the interaction.

(4) The information processing apparatus according to (3), in which
the image acquisition section acquires the captured image of the second user giving a pseudo-handshake to the first user displayed on the non-stereoscopic display, and
the superimposition processor superimposes an avatar image of a hand of the second user on the captured image of the first user such that the avatar image corresponds to an apparent position of the hand of the second user, the apparent position being an apparent position as viewed from the first user, the pseudo-handshake being given with the hand of the second user.

(5) The information processing apparatus according to (3) or (4), in which
the image acquisition section acquires the captured image of the second user performing pseudo-pointing at a target object displayed on the non-stereoscopic display, and
the superimposition processor superimposes an avatar image of a hand of the second user on the captured image of the first user such that the avatar image corresponds to an apparent position of the hand of the second user, the apparent position being an apparent position as viewed from the first user, the pseudo-pointing being performed with the hand of the second user.

(6) The information processing apparatus according to any one of (2) to (5), in which
on the basis of the depth information, the superimposition processor calculates a position of superimposition performed with respect to the captured image of the first user, the superimposition position corresponding to the apparent position of the result of the interaction of the second user, the apparent position being an apparent position as viewed from the first user, the interaction result being displayed on the stereoscopic display.

(7) The information processing apparatus according to (6), in which
the superimposition processor superimposes a marker on the captured image of the first user when the calculated superimposition position is not in a displayed-image range for the captured image of the first user.

(8) The information processing apparatus according to any one of (1) to (7), in which
the superimposition processor superimposes an alert image on the captured image of the first user when the result of the interaction of the second user is not displayed on the stereoscopic display.

(9) The information processing apparatus according to (8), in which
on the basis of information regarding an edge portion of a captured image of the second user performing the interaction, the superimposition processor determines whether the result of the interaction of the second user is displayed on the stereoscopic display.

(10) The information processing apparatus according to any one of (1) to (9), in which
the image acquisition section acquires a third-person-viewpoint image that is a captured image in which the first user and the stereoscopic display appear, the stereoscopic display displaying thereon a captured image of the second user, and
with respect to the second user displayed on the stereoscopic display appearing in the third-person-viewpoint image, the superimposition processor superimposes the result of the interaction of the second user on the third-person-viewpoint image displayed on the non-stereoscopic display.

(11) The information processing apparatus according to any one of (1) to (10), in which the image acquisition section acquires a captured image of the second user that is captured by a stereo camera, and the depth acquisition section acquires the depth information regarding the second user, the depth information being detected by the stereo camera.

(12) The information processing apparatus according to any one of (1) to (11), in which the stereoscopic display is an autostereoscopic display.

(13) The information processing apparatus according to any one of (1) to (11), in which the image acquisition section acquires a captured image of the second user, and the information processing apparatus further includes a display controller that controls each of display of the captured image of the first user on the non-stereoscopic display and display of the captured image of the second user on the stereoscopic display, the captured image of the first user being a captured image on which the result of the interaction of the second user is superimposed.

(14) An information processing method, including:

acquiring, by a computer system, a captured image of a first user who uses a stereoscopic display;

acquiring, by the computer system, depth information regarding a second user who uses a non-stereoscopic display that communicates with the stereoscopic display; and superimposing, by the computer system, a result of interaction of the second user on the captured image of the first user on the basis of the depth information, the captured image of the first user being displayed on the non-stereoscopic display.

(15) A recording medium that records therein a program that causes a computer system to execute an instruction used to perform a process including:

acquiring a captured image of a first user who uses a stereoscopic display;

acquiring depth information regarding a second user who uses a non-stereoscopic display that communicates with the stereoscopic display; and superimposing a result of interaction of the second user on the captured image of the first user on the basis of the depth information, the captured image of the first user being displayed on the non-stereoscopic display.

REFERENCE SIGNS LIST 1 telepresence system
4 user
5 user
6 stereoscopic display
7 camera
8 user image
9 user image
10 non-stereoscopic display
11 stereo camera
14 captured image
15 captured image
16 right hand
17 right hand
18 right-hand image
19 right-hand image
20 avatar image 23 information processing apparatus
30 image acquisition section
31 depth acquisition section
32 3D data converter
33 shortest-distance-pixel determining section
34 border determination section
35 2D-space-projection section
36 angle-of-view determining section
37 superimposition processor
38 display controller
41 angle of view
42 angle of view
45 arrow
46 arrow
47 word
49 document
53 third-person-viewpoint image

The invention claimed is:

1. An information processing apparatus, comprising:
a communication interface configured to remotely connect a stereoscopic display of a first user to a non-stereoscopic display of a second user; and
circuitry configured to:
acquire a first-user image representing the first user;
acquire depth information regarding the second user; and
superimpose an avatar image of a result of an interaction of the second user on the first-user image on a basis of the depth information such that the avatar image corresponds to a position of an established pseudo-interaction between the first user and the second user, wherein
the circuitry is connected to the communication interface, and
the non-stereoscopic display is configured to display the first-user image.

2. The information processing apparatus according to claim 1, wherein
the avatar image represents a body part of the second user.

3. The information processing apparatus according to claim 2, wherein
the established pseudo-interaction represents a pseudo-handshake from the second user to the first user, and
the circuitry is further configured to superimpose the avatar image on a hand of the first user in the first-user image.

4. The information processing apparatus according to claim 1, wherein
the circuitry is further configured to calculate a position of the avatar image on the basis of the depth information and a result of an interaction of the first user.

5. The information processing apparatus according to claim 4, wherein
the circuitry is further configured to superimpose a marker on the first-user image, the marker representing that the calculated position of the avatar image is not in a displayed-image range of the non-stereoscopic display.

6. The information processing apparatus according to claim 1, wherein
the circuitry is further configured to display an alert image when the result of the interaction of the second user is not displayed on the stereoscopic display.

7. The information processing apparatus according to claim 1, wherein the circuitry is further configured to:

acquire a captured image, which indicates the second user, from a stereo camera as a second-user image; and acquire the depth information based on the captured image.

8. The information processing apparatus according to claim 1, wherein the stereoscopic display is an autostereoscopic display.

9. The information processing apparatus according to claim 1, wherein the circuitry is further configured to control, via the communication interface, display of the non-stereoscopic display and the stereoscopic display.

10. A method for processing information in a telepresence system including a stereoscopic display of a first user and a non-stereoscopic display of a second user, the method comprising:

remotely connecting the stereoscopic display of the first user to the non-stereoscopic display of the second user via a communication interface;

acquiring a first-user image representing the first user;

acquiring depth information regarding the second user; and superimposing an avatar image of a result of an interaction of the second user on the first-user image on a basis of the depth information such that the avatar image corresponds to a position of an established pseudo-interaction between the first user and the second user, wherein the first-user image is displayed on the non-stereoscopic display.

11. A non-transitory computer-readable medium having stored thereon, computer-executable instructions which, when executed by circuitry of an information processing apparatus, cause the circuitry to:

remotely connect a stereoscopic display of a first user to a non-stereoscopic display of a second user via a communication interface;

acquire a first-user image representing the first user;

acquire depth information regarding the second user; and superimpose an avatar image of a result of an interaction of the second user on the first-user image on a basis of the depth information such that the avatar image corresponds to a position of an established pseudo-interaction between the first user and the second user, wherein the first-user image is displayed on the non-stereoscopic display.

* * * * *